(12) United States Patent
Barwicz et al.

(10) Patent No.: US 6,510,257 B1
(45) Date of Patent: Jan. 21, 2003

(54) MULTI-WAVELENGTH POLARIZATION MONITOR FOR USE IN FIBRE OPTIC NETWORKS

(75) Inventors: Andrzej Barwicz, Trois-Rivières (CA); Stephen William Roberts, Winchester (GB)

(73) Assignee: Measurement Microsystems A-Z Inc., Trois-Rivieres (CA)

( * ) Notice: Subject to any disclaimer, the term of this patent is extended or adjusted under 35 U.S.C. 154(b) by 0 days.

(21) Appl. No.: 10/092,602

(22) Filed: Mar. 8, 2002

(51) Int. Cl.[7] .................................................. G02B 6/00
(52) U.S. Cl. .......................... 385/11; 359/177; 359/124
(58) Field of Search ............................... 385/11–16, 24, 385/147; 359/175, 177, 187, 125, 161, 132–134, 124, 110, 133

(56) References Cited

U.S. PATENT DOCUMENTS

| | | | |
|---|---|---|---|
| 5,718,226 A | * 2/1998 | Riza | 600/437 |
| 5,745,274 A | * 4/1998 | Fatehi et al. | 359/124 |
| 5,801,863 A | * 9/1998 | Fatehi et al. | 359/110 |
| 5,892,606 A | * 4/1999 | Fatehi et al. | 359/175 |
| 5,991,023 A | 11/1999 | Morawski et al. | |
| 6,002,479 A | 12/1999 | Barwicz et al. | |
| 6,078,709 A | 6/2000 | Abramov et al. | |
| 6,081,355 A | * 6/2000 | Sharma et al. | 359/110 |
| 6,130,766 A | 10/2000 | Cao | |

FOREIGN PATENT DOCUMENTS

GB 0108039.9 5/2001

* cited by examiner

Primary Examiner—Akm E. Ullah
(74) Attorney, Agent, or Firm—Freedman & Associates

(57) ABSTRACT

A multi-wavelength polarization monitor for use in optical networks is disclosed. A received light signal is beam split into first and second signal portions using a beam splitter having known optical characteristics. Each of the first and second signal portions is then dispersed onto a detector array using a first and second dispersive element having known polarization-dependent characteristics. The signal portions are dispersed other than as channelized data within known channels. The dispersed first and second signal portions are then detected using a first and a second detector array and electrical signals in dependence thereupon are provided for A/D conversion and digital signal processing. Using a processor the signals are spectrally augmented and the polarization of the light signal within each of the predetermined wavelength ranges corresponding to the known channels is determined in dependence upon the spectrally augmented signals and based on the known optical characteristics of the elements involved. The disclosed multi-wavelength polarization monitor is realised in a relatively simple manner and allows manufacturing of the same as a very compact integrated device at relatively low cost.

32 Claims, 15 Drawing Sheets

1)

2)

MULTI-WAVELENGTH POLARIZATION MONITOR FOR USE IN FIBRE OPTIC NETWORKS

FIELD OF THE INVENTION

This invention relates generally to multi-wavelength polarisation monitors and more particularly to a multi-wavelength polarisation monitor resulting in a very compact device manufactured at relatively low cost.

BACKGROUND OF THE INVENTION

The rapid adoption of the Internet has created a need for high-speed optical networks. High-speed optical networks use wavelength-division-multiplexed (WDM) optical fibre systems characterised by the simultaneous transmission through many different communication channels over different wavelengths within a single optical fibre. For example, communication channels are over wavelengths typically within the 1530–1565 nanometer (nm) range, and separated by multiples of 100 Gigahertz (GHz), i.e., approximately 0.8 nm.

An optical monitor is a critical component in optical networks. Within such systems, the ability to efficiently monitor the performance of the system for the different wavelengths of light travelling through a single fibre is highly desirable during installation and testing as well as normal operation. Typically optical monitors accompany multi-wavelength fibre optic amplifiers, such as erbium-doped fibre amplifiers, and are used for providing feedback. They are also useful in ensuring maintained coupling efficiencies and in test equipment for optical communication equipment. In particular, monitoring of the polarisation of the transmitted light is highly desirable. Polarised light is is highly sensitive to coupling related losses as well as other polarisation dependent loss (PDL). Performance of numerous components of an optical network is either affected by the polarisation of the transmitted light or components must be designed to meet strict PDL specifications.

Conventional optical monitors for multi-wavelength fibre optic communication needs come in a variety of different configurations. In U.S. Pat. No. 6,078,709 an optical monitor is demonstrated. The monitor has a grating in a fibre for deflecting a portion of light propagating within the fibre out of the fibre. This deflected portion is then detected with a detector. The grating disclosed achieves multi-wavelength behaviour through application of heat in order to vary its frequency response. As the grating expands, the wavelength of light that it deflects changes. By controlling the temperature precisely a known wavelength is monitored precisely. This design has the benefit of being able to monitor any wavelength within a given range, however it is only capable of supporting monitoring of one wavelength channel at a time. Further, a precise heating element is needed to provide adequate performance.

Another common method for performing multi-wavelength monitoring is to tap off some of a light signal and to use a wavelength dispersing element in order to separate the light such that light within each channel is incident upon a different detector from a plurality of optical detectors. This device has the advantage that all of the wavelengths are monitored at once. Unfortunately, such a device is often produced in bulk optics and is hampered by the above mentioned manufacturing bottlenecks. When manufactured with integrated optical technology, the resulting demultiplexer has many output ports for coupling to fibres and, as such is extremely difficult to manufacture.

Conventional polarisation monitors use a polarisation splitter for splitting incoming light into its principal states of polarisation as used, for example, in the device disclosed in U.S. Pat. No. 6,130,766, which are then separately sensed. However, a polarisation splitter tends to be difficult to build especially to the precise tolerances necessary for a multi-wavelength monitor.

In order to overcome these and other shortcomings of the prior art it is an object of the invention to provide a multi-wavelength polarisation monitor absent a need for extremely precise optical components.

It is further an object of the invention to provide a multi-wavelength polarisation monitor of increased precision by determining the polarisation of light within each of a plurality of wavelength channels.

SUMMARY OF THE INVENTION

The invention demonstrates a relatively simple way and device for monitoring polarisation in multi-wavelength applications. The polarisation monitor allows manufacture of a very compact device at relatively low cost.

In accordance with the invention, there is provided a method for monitoring the polarisation of a multi-wavelength light signal in an optical network comprising the steps of:

beam splitting the light signal into two portions using a beam splitter having known optical characteristics, wherein the polarization of each of the two portions comprises both a $T_E$ and a $T_M$ component;

demultiplexing the first signal portion of the two separated signal portions into a first plurality of signals within each of predetermined wavelength ranges corresponding to known channels using a first demultiplexer having known polarisation-dependent characteristics;

detecting the light intensity of each of the first plurality of signals and providing a first plurality of electrical signals in dependence thereupon;

demultiplexing the second signal portion of the two separated signal portions into a second plurality of signals within each of the predetermined wavelength ranges corresponding to the known channels using a second demultiplexer having a known second PDL;

detecting the light intensity of each of the second plurality of signals and providing a second plurality of electrical signals in dependence thereupon;

converting the first and second plurality of electrical signals into a first and second plurality of digital data; and, using a processor, determining the polarisation of the light signal of each wavelength channel in dependence upon the first and second plurality of digital data and based on the known optical characteristics and the first and second PDL.

In accordance with another embodiment of the invention, there is provided a method for monitoring the polarisation of a multi-wavelength light signal in a optical network comprising the steps of:

beam splitting the light signal into to portions using a beam splitter having known optical characteristics, wherein the polarization of each of the two portions comprises both a $T_E$ and a $T_M$ component;

disperisng the first signal portion of the two separated signal portions onto a first detector array using a first dispersive element having a known first PDL;

detecting the light intesity incident upon each detector element of the first detector array and providing a first plurality of electrical signals in dependence thereupon;

dispersing the second signal portion of the two separated signal portions onto a second detector array using a second disperive element having a known second PDL;

detecting the light intensity incident upon each detector element of the second detector array and providing a second plurality of electrical signals in dependence thereupon;

converting the first and second plurality of electrical signals into a first and second plurality of digital data; and, using a processor, determining the polarisation of the light signal of each wavelength channel in dependence upon the first and second plurality of digital data and based on the known optical characteristics and the first and second PDL.

In accordance with another aspect of the invention, there is provided a multi-wavelength polarisation monitor comprising:

and input port of receiving a light signal;

a beam splitter having known optical characteristics for beam splitting the light signal into two portions, wherein the polarization of each of the two portions comprises both a $T_E$ and a $T_M$ component;

a first demultiplexer having a known first PDL for demultiplexing the first signal portion of the two separated signal portions into a first plurality of signals corresponding to wavelength channels;

a first plurality of detectors for detecting the light intensity of each of the first plurality of signals and providing a first plurality of electrical signals in dependence thereupon;

a second demultiplexer having a known second PDL for demultiplexing the second signal portion of the two separated signal portions into a second plurality of signals corresponding to wavelength channels;

a second plurality of detectors for detecting the light intensity of each of the second plurality of signals and providing a second plurality of electrical signals in dependence thereupon;

an A/D converter for converting the first and second plurality of electrical signals into a first and second plurality of digital data; and, a processor for determining the polarisation of the light signal of each wavelength channel in dependence upon the first and second plurality of digital data and based on the known optical characteristics and the first and second PDL.

In accordance with the invention, there is further provided a multi-wavelength polarisation monitor comprising:

an input port for receiving a light signal;

a beam splitter having known optical characteristics for beam splitting the light signal into a first and second signal portions, wherein the polarization of each of the two portions comprises both a $T_E$ and a $T_M$ component;

a first dispersive element having a known first PDL for dispersing the first signal portion onto a first detector array, the light dispersed other than as channelised data within known channels;

a first detector array having more detector elements than a number of known channels for detecting the light intensity incident upon each detector element of the first detector array and providing a first plurality of electrical signals in dependence thereupon;

a second dispersive element having a known second PDL for dispersing the second signal portion onto a second detector array, the light dispersed other than as channelised data within the known channels;

a second detector array having more detector elements than a number of known channels for detecting the light intensity incident upon each detector element of the second detector array and providing a second plurality of electrical signals in dependence thereupon;

an A/D converter for converting the first and second plurality of electrical signals into a first and second plurality of digital data; and, a processor for performing spectral augmentation on the first and second plurality of digital data and for determining the polarisation of the light signal within each of the predetermined wavelength ranges corresponding to the known channels in dependence upon the spectrally augmented first and second plurality of digital data and based on the known optical characteristics and the first and second PDL.

In accordance with the invention there is yet further provided a multi-wavelength polarisation monitor comprising:

an input port for receiving a light signal;

a dispersive element having a known PDL for dispersing the signal onto a detector array, the light dispersed other than as channelised data within known channels;

a detector array having more detector elements than a number of known channels for detecting the light intensity incident upon each detector element of the detector array and providing a plurality of electrical signals in dependence thereupon;

an A/D converter for converting the plurality of electrical signals into a plurality of first digital data;

a digital port for receiving second digital data; and, a processor for performing spectral augmentation on the plurality of first data and for determining the polarisation of the light signal within each of the predetermined wavelength ranges corresponding to the known channels in dependence upon the spectrally augmented plurality of first digital data and the received second digital data and based on the known PDL of the dispersive element.

BRIEF DESCRIPTION OF THE DRAWINGS

The invention will now be described with reference to the attached drawings in which.

DETAILED DESCRIPTION OF THE INVENTION

The invention demonstrates a relatively simple method and device for monitoring polarisation in multi-wavelength applications. The polarisation monitor allows manufacture of a very compact device at relatively low cost. It has been found that it is possible to determine the polarization of a light beam—ratio of the principal states of polarisation $T_E$ and $T_M$ of the light beam—as follows:

beam splitting the light beam into two portions using a beam splitter and guiding each of the two separated beam portions to a detector where the splitting and guiding have known but different PDL related optical characteristics and wherein the polarization of each of the two portions comprises both a $T_E$ and a $T_M$ component; and, determining the polarisation of the light beam based on the known optical characteristics of the two optical paths and the measured light intensities of the two beam portions.

Beam splitting the light beam into two portions and guiding each of the two portions using different optical paths having known but different PDL to a detector results in a relatively simple method for determining the polarisation of a light beam. The PDL in each of the two optical paths affect the light intensity of the respective beam portion in dependence upon the polarisation of the light beam. The different PDL of the two different optical paths has a different effect on the intensity of each of the two beam portions. Therefore, measuring the intensity of each of the two beam portions provides enough information for determining the portions of the two principal states of polarisation $T_E$ and $T_M$ of the light beam, provided the optical characteristics of the two optical paths are known.

Alternatively, the splitter splits the light into two optical signals with different polarisation component intensities for the $T_E$ and $T_M$ polarisation states.

Alternatively, the $T_E$ and $T_M$ polarisation difference is induced solely in the optically guiding paths.

Of course, a monitor employing three or more paths is also possible according to the invention.

Figure 1A:
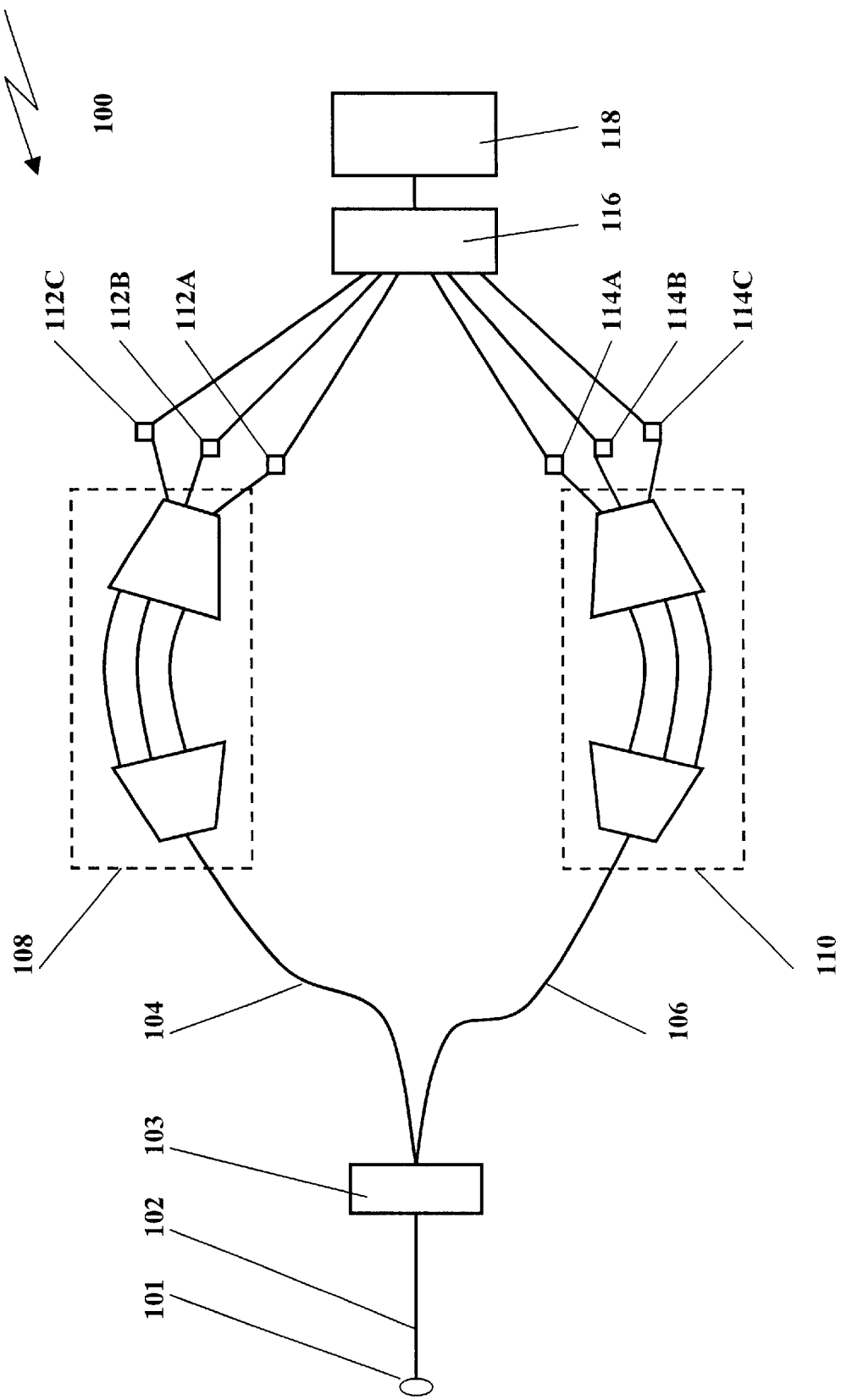
FIG. 1a is a simplified block diagram of a multi-wavelength polarisation monitor according to the invention.
Figure 1B:
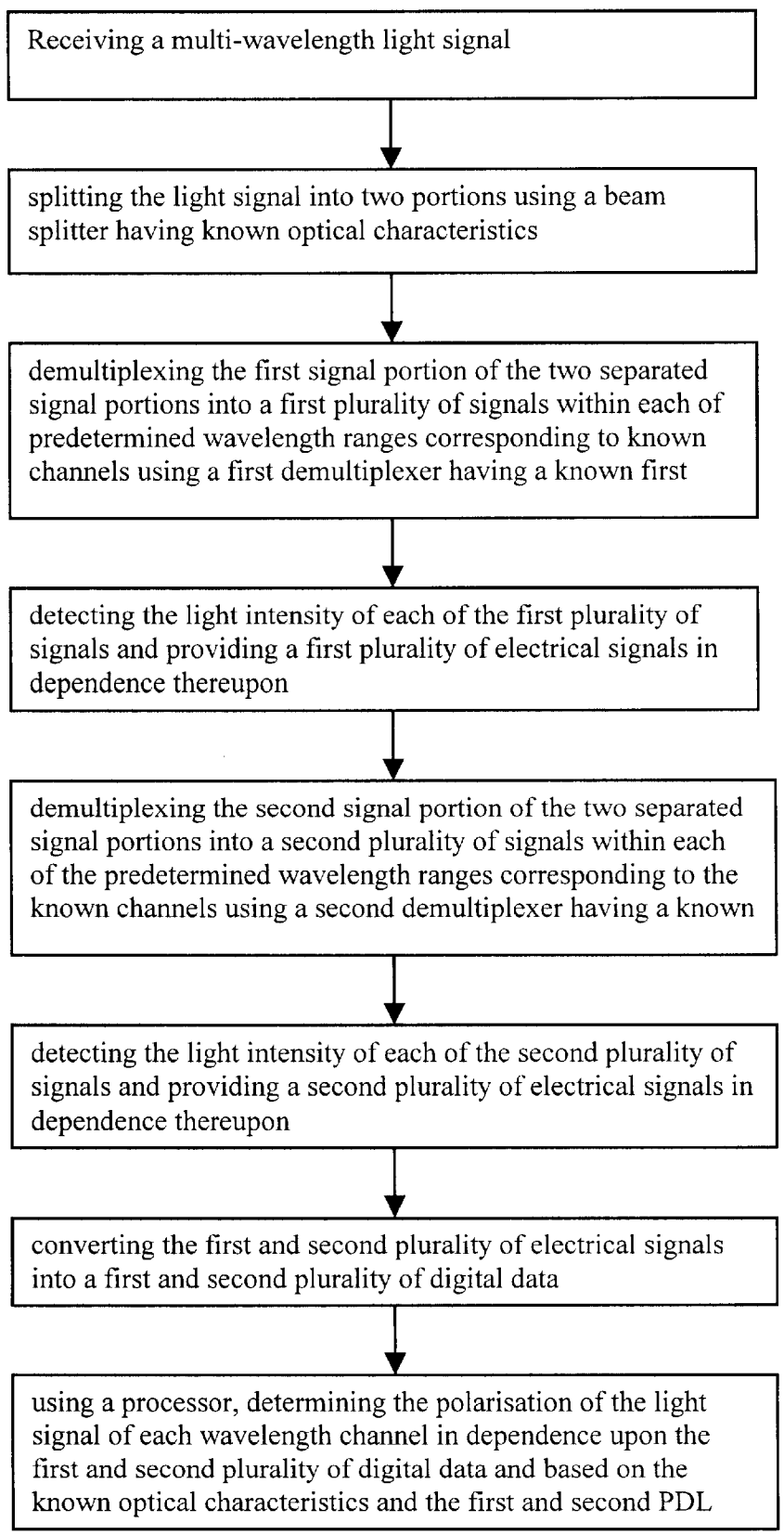
FIG. 1b is a simplified flow diagram of a method for monitoring the polarisation of a multi-wavelength light signal according to the invention.
Figure 2:
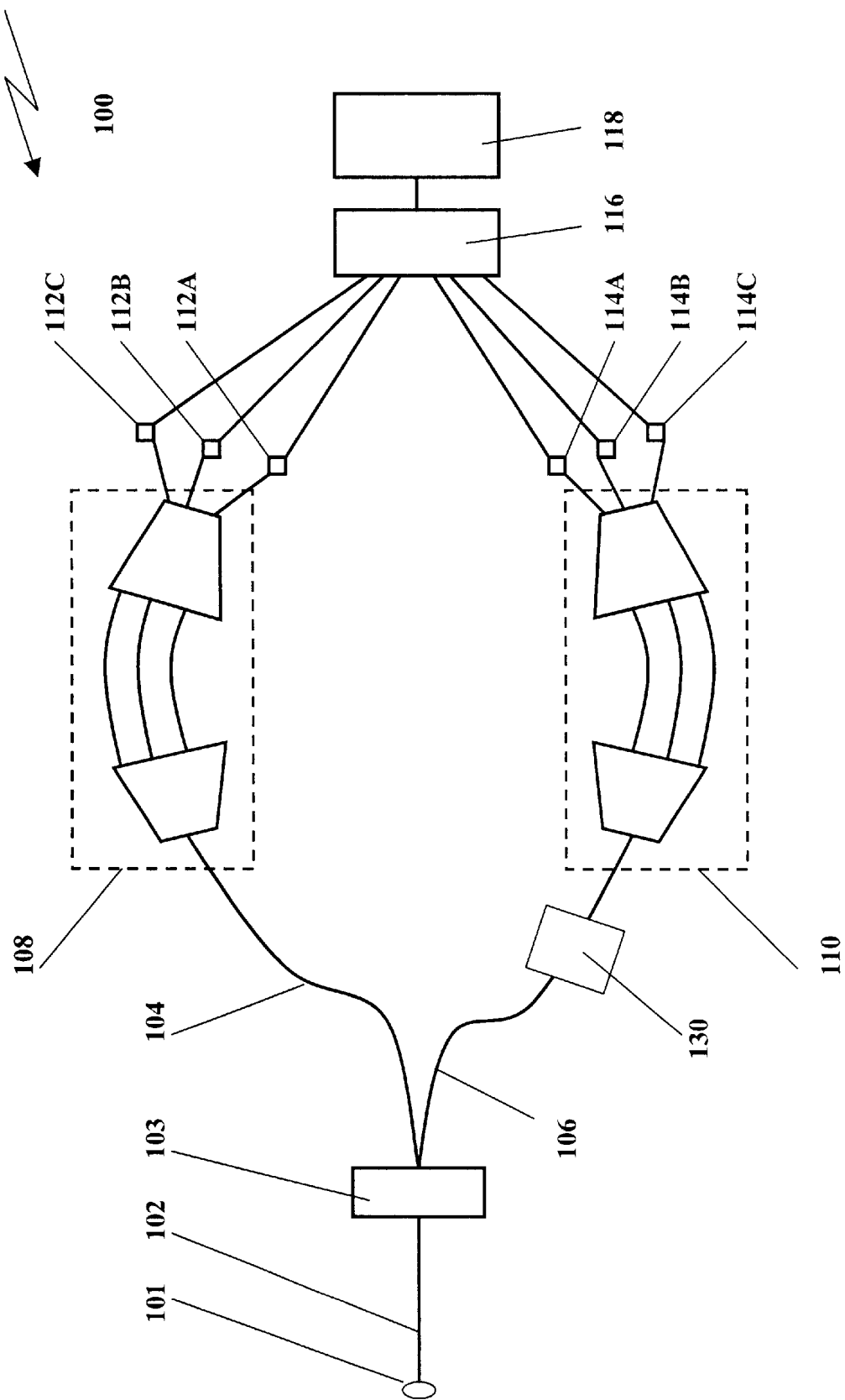
FIG. 2 is a simplified block diagram of an embodiment of a multi-wavelength polarisation monitor according to the invention.

Referring to FIGS. 1a and 1b, one embodiment of a multi-wavelength polarisation monitor 100 according to the invention is shown. A tapped light signal is provided via a port 101 and a waveguide 102 to a beamsplitter 103. The tapped light signal is obtained by connecting the port 101 of the monitor 100 to an end of a waveguide of a fibre optic network, which is applicable during installation and testing of the network. Alternatively, the port 101 is connected to a partially reflective mirror interposed into the network to tap a small portion of the light signal within the fibre in order to perform monitoring thereof during normal operation of the network. In the beamsplitter 103, the light signal is beam split into two portions, wherein the polarization of each of the two portions comprises both a $T_E$ and a $T_M$ component. Optionally, the two portions of the split light signal have approximately a same light intensity and proportion of $T_E$ and a $T_M$ light. The two portions are then guided through two different optical paths having different optical characteristics. The two portions are then provided via waveguides 104 and 106 to optical wavelength division demultiplexers 108 and 110, respectively. The optical wavelength division demultiplexers 108 and 110 such as, for example, array waveguide gratings demultiplex the two portions of the light signal. A first portion of the tapped light signal propagates through demultiplexer 108 and is separated into different optical signals within separate wavelength channels. For simplification, separation into only three wavelength channels is shown, but as is obvious to a person of skill in the art the polarisation monitor according to the invention is not limited thereto. For example, many current optical networks operate using multiplexing of 16 or more wavelength channels. Each different optical signal is provided to a detector 112a, 112b, and 112c. The detectors 112a, 112b, and 112c detect the light incident thereupon and provide an electrical signal in dependence upon an intensity of incident light at a given time or during a given time period. The number of detectors varies based on a number of wavelength channels to be monitored. The second portion of the tapped light signal is demultiplexed in demultiplexer 110 providing different optical signals within the same separate wavelength channels as for the first portion of the light signal. The different optical signals are then sensed using detectors 114a, 114b, 114c. After conversion of the signal from each of the detectors 112 and 114 into a digital signal in A/D converter 116 digital data in dependence upon the signals is provided to processor 118. Using the processor 118 the two signal portions of respective wavelength channels are processed in order to determine the polarisation of light for each wavelength channel. The optical characteristics of the beam splitter 103—PDL and ratio of the light intensity in the two separated portions as well as the first PDL of the first demultiplexer 108 and the second different PDL of the second demultiplexer 110 are known, for example, through a calibration process, are different, and are other than mere multiples one of another. The different PDL for the demultiplexers 108 and 110 provides two different signals for each wavelength channel allowing determining the ratio of the two principal states of polarisation $T_E$ and $T_M$. Alternatively, demultiplexers having a same PDL are used together with a polarisation affecting device 130 having known characteristics interposed in the optical path of one signal portion, as shown in FIG. 2.

Figure 3A:
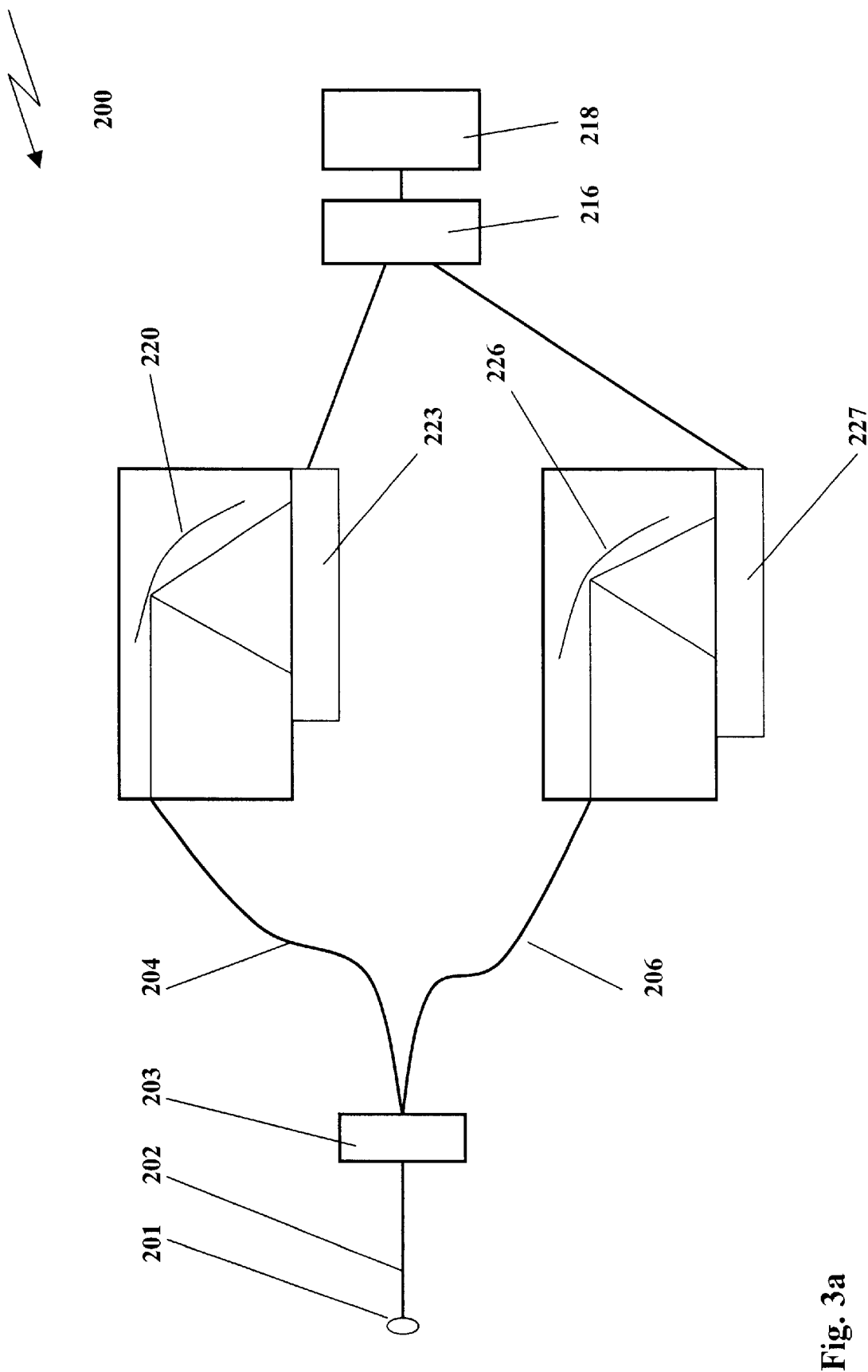
FIG. 3a is a simplified block diagram of another multi-wavelength polarisation monitor according to the invention.
Figure 3B:
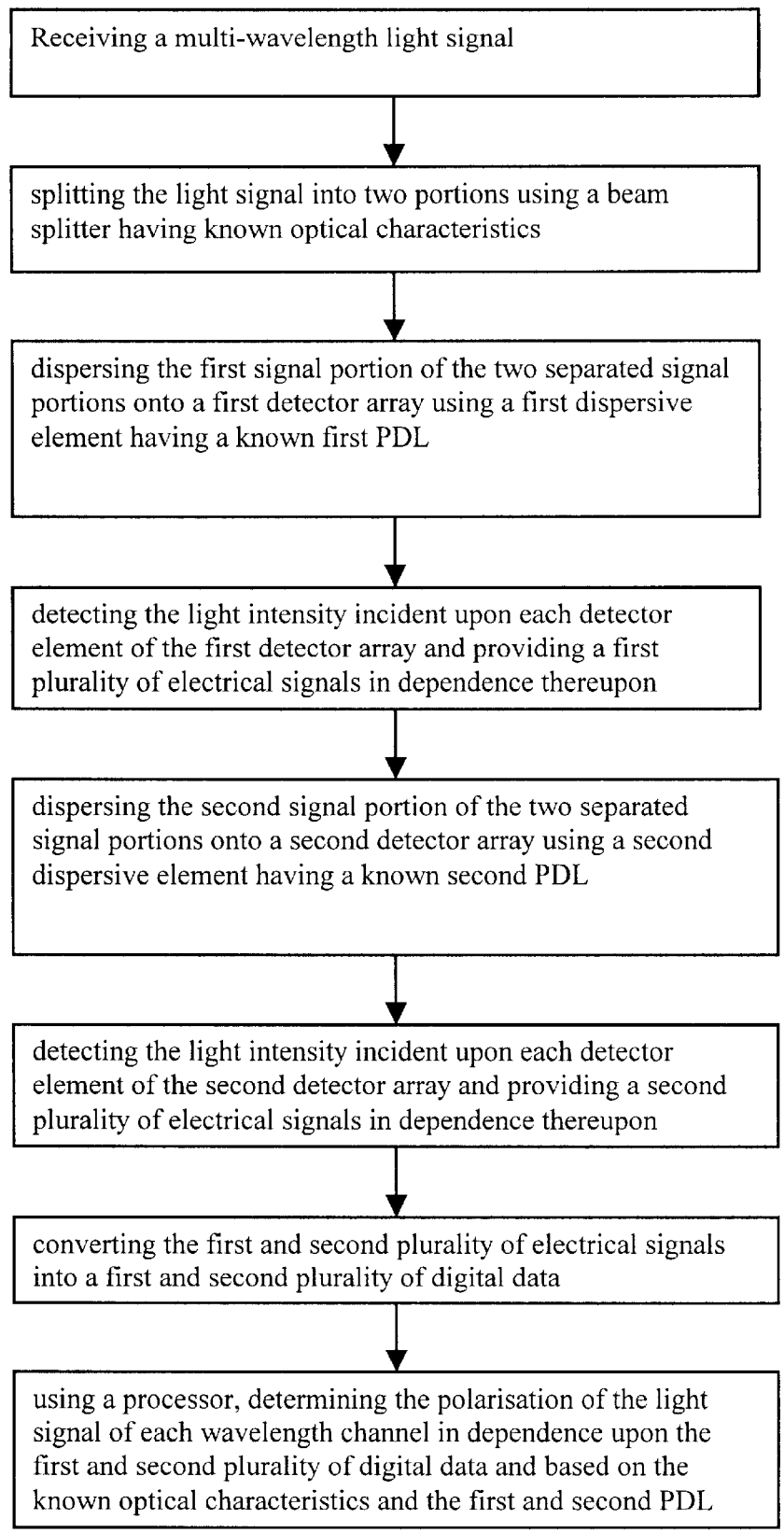
FIG. 3b is a simplified flow diagram of another method for monitoring the polarisation of a multi-wavelength light signal according to the invention.

Referring to FIGS. 3a and 3b, another preferred embodiment of a multi-wavelength polarisation monitor 200 according to the invention is shown. Here, each of the two light signal portions provided by beam splitter 203 is dispersed in dependence upon wavelength by a dispersive element in the form of an array waveguide grating 220 and 226, respectively. The polarization of each of the two portions comprises both a $T_E$ and a $T_M$ component. The dispersed light signal portions are sensed using detector arrays such as photodetector arrays 223 and 227 in the form of, for example, charge coupled devices, respectively.

Preferably, light within each wavelength channel is incident upon at least three different detector elements. For example, monitoring 40 wavelength channels using a photodetector array comprising 128 pixels or detector elements provides a resolution of 3 pixels per wavelength channel plus eight pixels for compensating any misalignment between the dispersed light signal and the detector array. This unchannelised spectrum is detected by the arrays of detectors 223 and 227 to form a quantised analogue spectrum of each portion of the light signal. Though the quantised analogue spectrum is not truly "analogue" in nature since it is quantised in two dimensions—wavelength and amplitude, it is not channelised in that fight reaching a single detector is not confined to within a single channel. The light incident upon the detectors results in a data signal from each detector based on an amplitude of the light incident thereon.

The two data signals are provided to a processor 218 after conversion in AID converter 216 for processing thereof. The two data signals are transformed into a more accurate spectral representation of the tapped optical signal. Accurate processing of the detected data is performed based on calibration data. The calibration data is acquired by providing one or more known optical signals to the device in order to determine characteristics of the device and alignment between the dispersive elements 220 and 226 and the array of detectors 223 and 227. The devices are calibrated with a known input signal in order to obtain accurate transformations of the input signals. The calibration also acts to compensate for optical imperfections in the device.

Once the data are captured, interpretation of the data is not a straightforward task. Before the data are interpreted, the spectral data are augmented—this extends from correction of manufacturing tolerance based errors to spectral enhancement. For example, when captured at a resolution of 10 nm, spectral data is not useful for most applications. In order to produce a monitor at a reasonable cost using the current invention, it is essential that the captured spectrum is augmented prior to channelisation. As proposed herein, the method of augmentation involves estimation of spectral values from the low-resolution spectrum based on existing calibration data of the sensor. The augmentation process is set out below.

Figure 4:
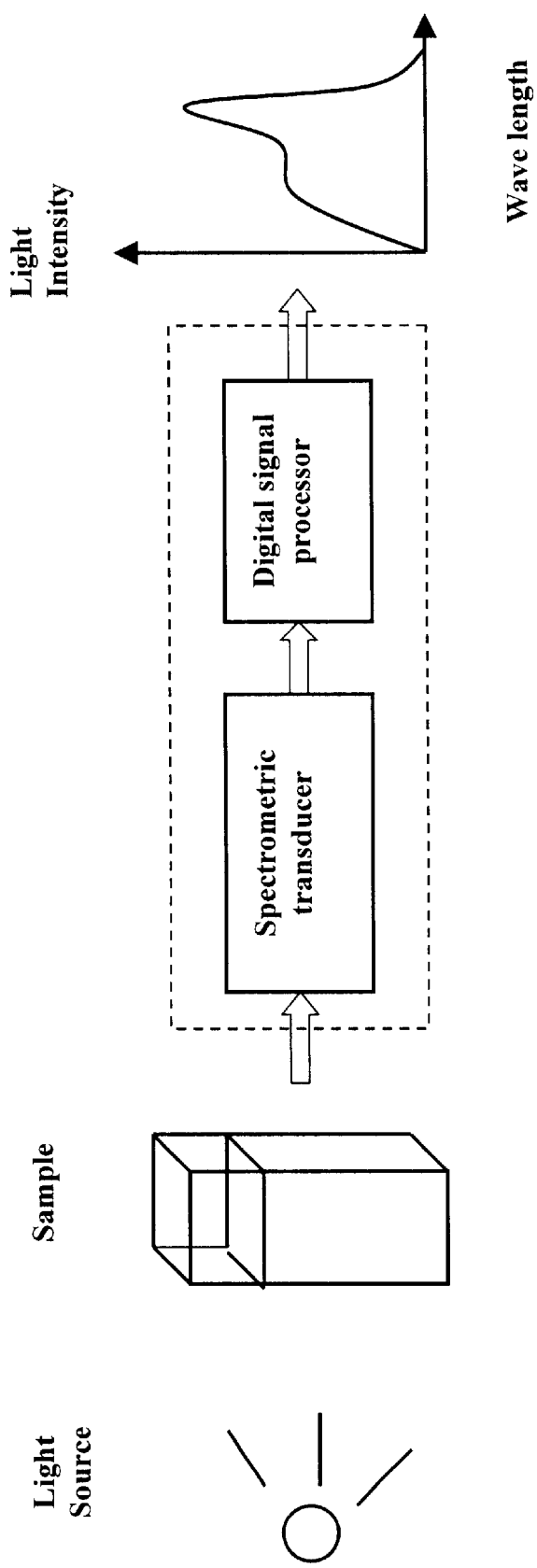
FIG. 4 is a simplified diagram of a spectrometric apparatus; a computing means in the form of a microprocessor, such as a digital signal processor.
Figure 5A:
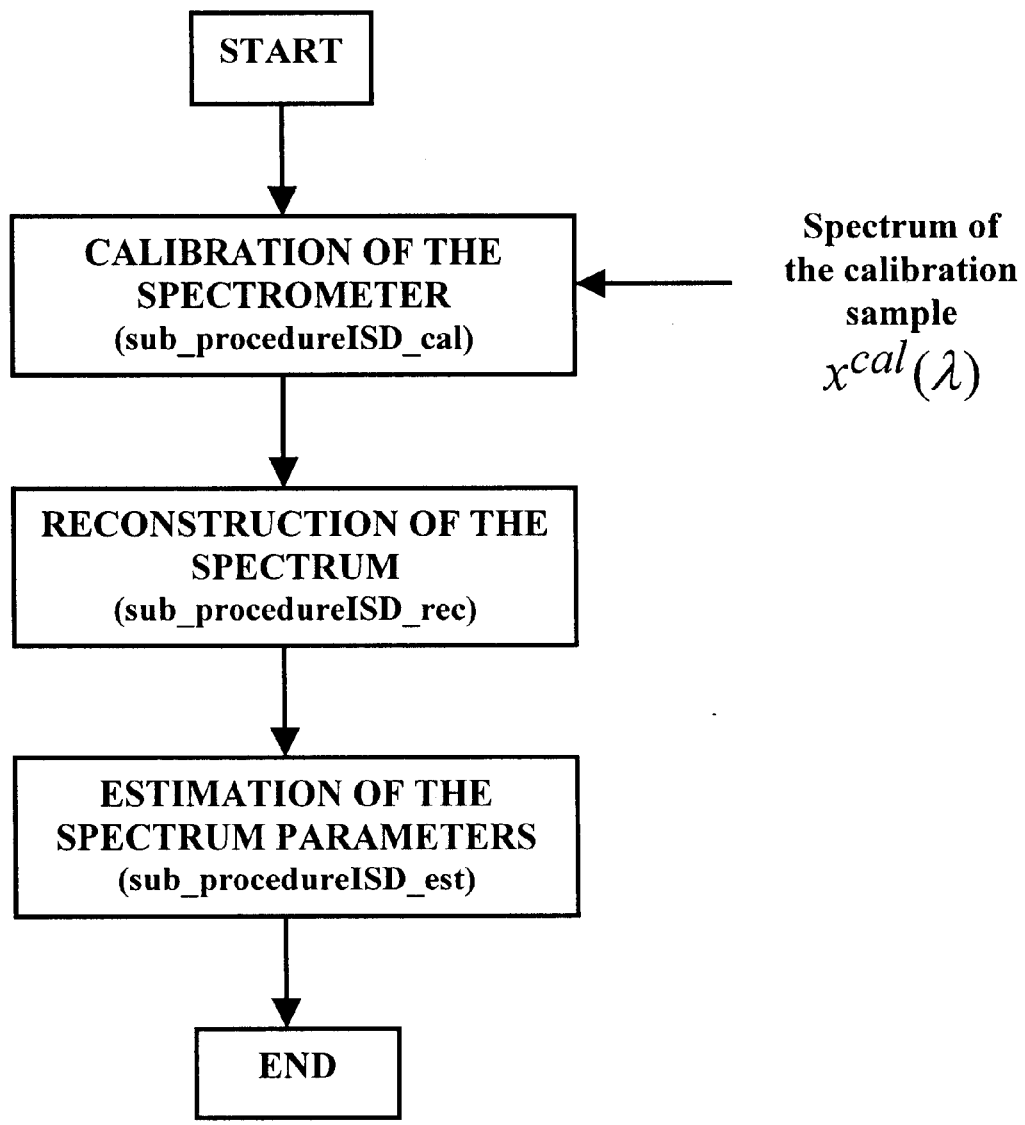
FIGS. 5a through 5d are simplified flow diagrams of each of 4 steps according to an exemplary embodiment of the invention.
Figure 5B:
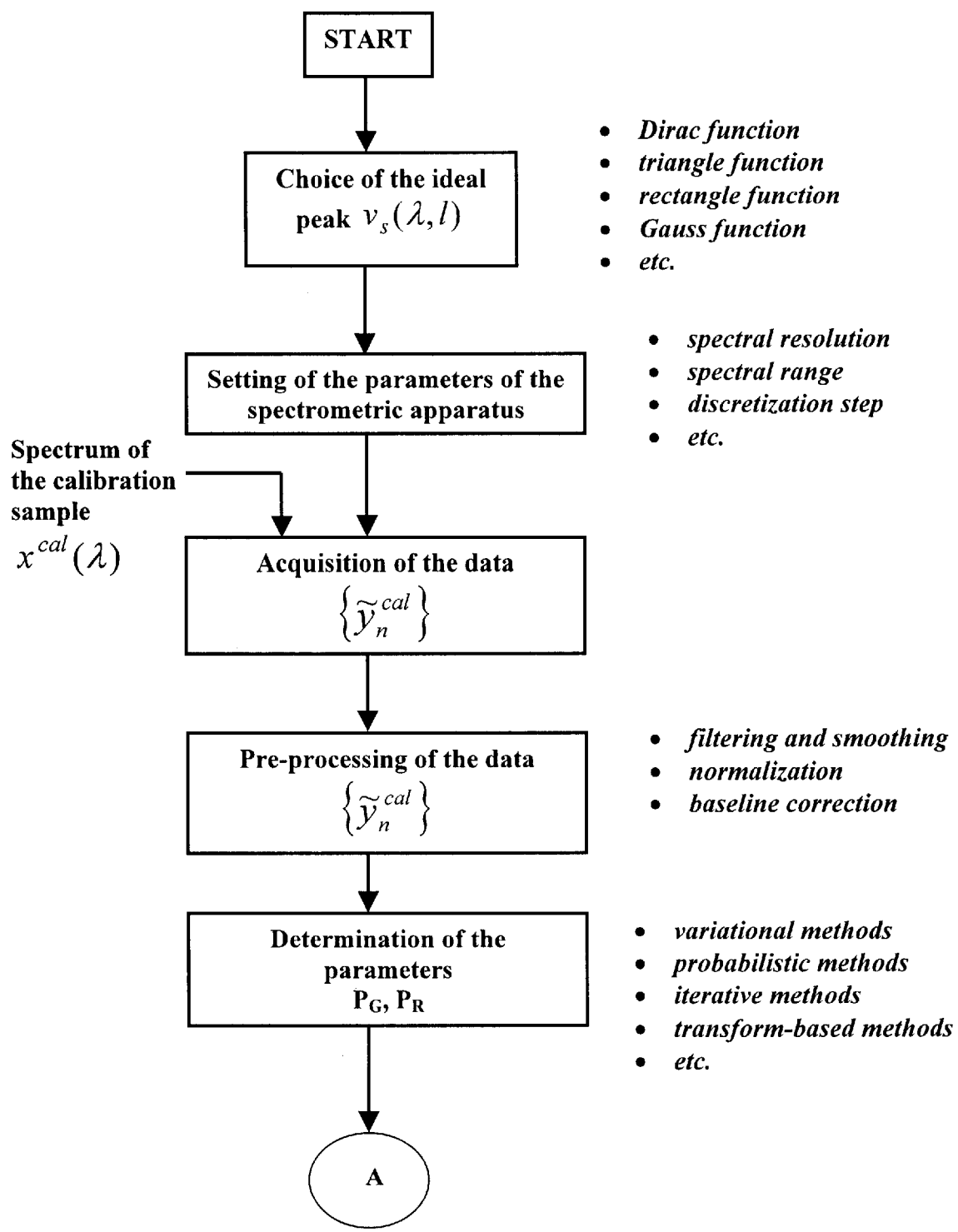
Figure 5C:
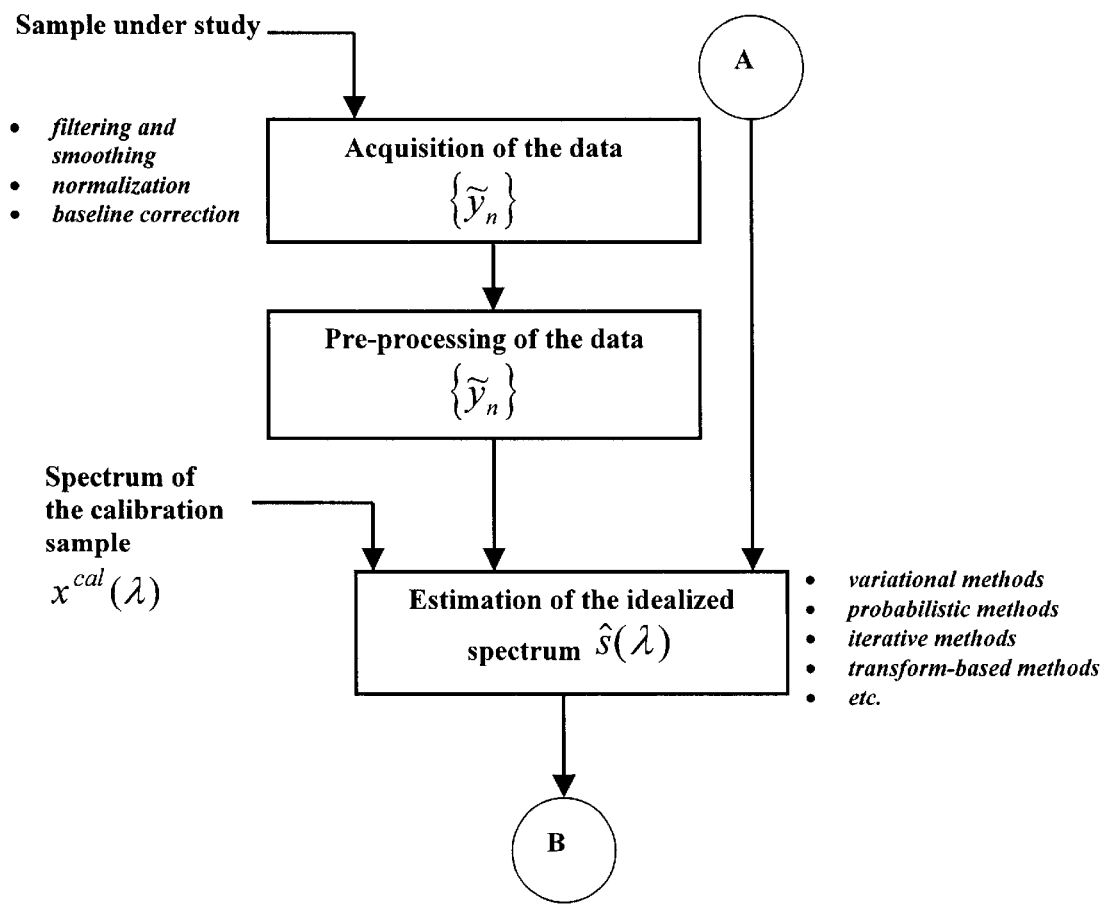
Figure 5D:
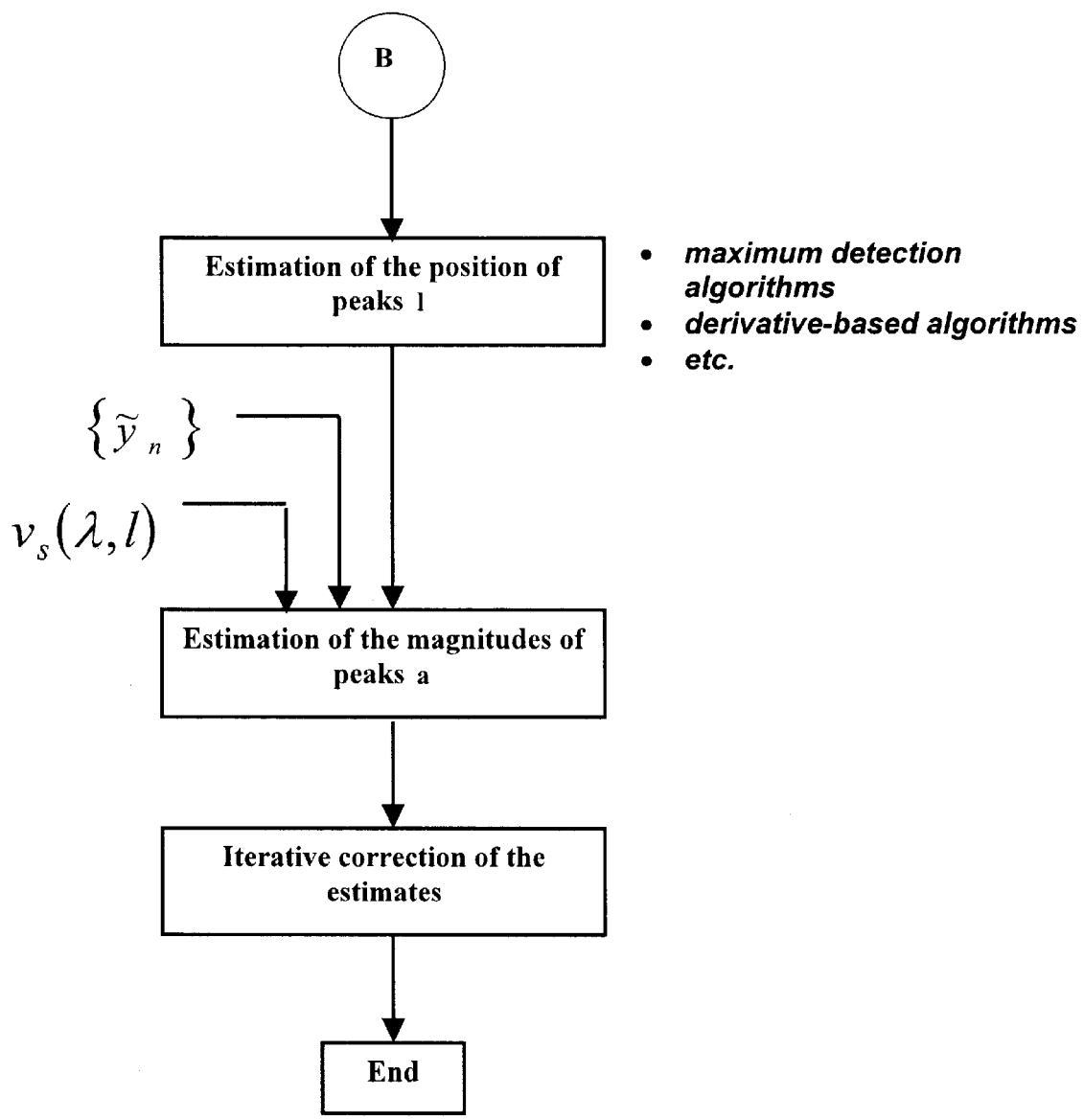

Referring to FIG. 4, a system is shown comprising the following: a spectrometric apparatus, in the form of a spectrometric transducer for converting an analogue electromagnetic signal, such as light containing information of a measured spectrum, into a digital electrical signal representing the spectrum; a computing means in the form of a microprocessor, a general-purpose digital signal processor, or an application-specific digital signal processor; and, other functional elements necessary for measuring a spectrum of a sample of an analysed substance (hereinafter referred to as sample).

The method of augmenting spectra set out below is useful as a method implemented within the processor. It is described herein as an embodiment of a method of implementing spectral augmentation. Of course, other suitable methods as are known or will become known in the art are applicable. The method of augmenting spectra set out below is also for general application to other spectrometric devices.

The following notation is used for the description of the method of augmenting spectra:

$\lambda$—wavelength; $\lambda \in [\lambda_{min}, \lambda_{max}]$;

N—number of data provided to the processor;

$\Delta\lambda$—step of wavelength discretization; $\Delta\lambda = (\lambda_{max} - \lambda_{min})/(N-1)$;

$\lambda_n$—n-th datum provided to the processor; $\lambda_n = \lambda_{min} + (n-1)\Delta\lambda$ for $n=1, \ldots, N$;

$x(\lambda)$—real spectrum of a telecommunication signal;

l—vector of the positions of peaks the spectrum $x(\lambda)$ is composed of; $l = [l_1\ l_2\ \ldots\ l_K]^T$;

$\hat{l}$—an estimate of l;

a—vector of magnitudes of peaks the spectrum $x(\lambda)$ is composed of; $a = [a_1\ a_2\ \ldots\ a_K]^T$;

$\hat{a}$—an estimate of a;

$s(\lambda; l, a)$—an idealized spectrum of a telecommunication signal, assumed to have the form:

$$s(\lambda; \mathbf{l}, \mathbf{a}) = \sum_{k=1}^{K} a_k v_s(\lambda, l_k)$$

where $v_s(\lambda, l)$ is an isolated, normalized peak in $s(\lambda; l, a)$, whose maximum is located at $$\lambda = l;\quad \int_{-\infty}^{+\infty} v_s(\lambda, l) d\lambda = 1 \quad \text{for}\ l \in [\lambda_{min}, \lambda_{max}];$$

$\{\tilde{y}_n\}$—spectrometric data representative of $x(\lambda)$, provided to the processor;

$$\{\tilde{y}_n\} = \{\tilde{y}_n | n=1, \ldots, N\};$$

$x^{cal}(\lambda)$—real spectrum of an optical signal used for calibration of the monitor;

$s(\lambda; l^{cal}, a^{cal})$—an idealized spectrum of an optical signal used for calibration of the monitor;

$\{\tilde{y}_n^{cal}\}$—data, representative of $x^{cal}(\lambda)$ used for calibration of the monitor;

$$\{\tilde{y}_n^{cal}\} = \{\tilde{y}_n^{cal} | n=1, \ldots, N^{cal}\};$$

G—an operator (algorithm) of projection mapping the idealized spectrum $s(\lambda; l, a)$ into the space of the data:

$$\{\tilde{y}_n\} = G[s(\lambda; l, a); p_G]$$

where $p_G$ is a vector or matrix of the parameters of the operator G, to be determined during calibration of the monitor; $p_G = [p_{G,1}\ p_{G,2}\ \ldots]^T$ or:

$$p_G = \begin{bmatrix} p_{G,1,1} & p_{G,1,2} & \cdots \\ p_{G,2,1} & p_{G,2,2} & \cdots \\ \vdots & \vdots & \ddots \end{bmatrix}$$

R—an operator of reconstruction, such as a generalized deconvolution operator, for transforming the data $\{\tilde{y}_n\}$ into an estimate $\hat{s}(\lambda)$ of $s(\lambda; l, a)$:

$$\hat{s}(\lambda) = R[\{\tilde{y}_n\}; p_R]$$

where $p_R = [p_{R,1}\ p_{R,2}\ \ldots]^T$ are parameters of the operator R including regularization parameters, the parameters determined during calibration of the monitor.

The main objective of the method of enhancing resolution and correction of spectral data—augmenting spectra—is estimation of the positions l and magnitudes a of the peaks contained in the spectrum of a sample under study $x(\lambda)$ on the basis of the acquired spectrometric data $\{\tilde{y}_n\}$. The feasibility of this operation is critically conditioned by an auxiliary operation on the reference data $\{\tilde{y}_n^{cal}\}$ and corresponding reference spectrum $x^{cal}(\lambda)$, referred to as calibration of the monitor. This operation is aimed at the acquisition of information on a mathematical model of a relationship between spectrometric data and an idealized spectrum, which underlies the method according to the present embodiment for estimation of the parameters l and a. Although calibration does not necessarily directly precede augmentation of a sequence of spectrometric data $\{\tilde{y}_n\}$, valid calibration results should be available during this process.

A significant difficulty, related to estimation of positions l and magnitudes a of spectrometric peaks, relates to blurring of those peaks caused by imperfections in the optical port of the monitor such as endface abnormalities, fibre misalignment, grating imperfections and, when desired, independently sensable parameters such as temperature. This difficulty is overcome according to the present method through application of a process for reconstruction of an idealized spectrum $s(\lambda; l,a)$ in order to correct the spectrometric data.

In accordance with the above general functional requirements and referring to FIGS. 5a through 5d, the method comprises the following steps:

calibration of a monitor (the sub-procedure ISD_cal),
    reconstruction of a spectrum $s(\lambda;l,a)$ (the sub-procedure ISD_rec),
    estimation of parameters l and a on the basis of an estimate $\hat{s}(\lambda)$ of $s(\lambda;l,a)$ (the sub-procedure ISD_est).
    sub-procedure ISD_cal The sub-procedure ISD_cal comprises the following steps:

choosing a form of ideal peak $v_s(\lambda,l)$ and of operators G and R;
    choosing a calibration spectrum $x^{cal}(\lambda)$;
    setting measurement parameters of the monitor;
    acquiring data $\{\tilde{y}_n^{cal}\}$ representative of the calibration spectrum $x^{cal}(\lambda)$;
    pre-processing of the data $\{\tilde{y}_n^{cal}\}$ to eliminate outliers, to perform baseline correction, smoothing, acquiring a priori information in the form of a pre-estimate of the variance of errors in the calibration data, and normalization;
    determining parameters $p_G$ of the projection operator G, and parameters $p_R$ of the reconstruction operator R.

A process for performing these estimations is preferably tuned for use with a specific monitor. For example, when known variance exists in a type of dispersive element, this a priori knowledge is beneficial in determining the process for performing estimations and thereby determining a process for calibration. Of course, this is not necessary since some processes for estimation and calibration are substantially universal for spectrometric monitors.

sub-procedure ISD_rec

The sub-procedure ISD_rec comprises the following steps:

setting measurement parameters substantially the same as those above;
    acquiring data $\{\tilde{y}_n\}$ representative of a real spectrum;
    preprocessing of the data $\{\tilde{y}_n\}$ in a similar fashion to the preprocessing for determining the calibration data;
    estimating an idealized spectrum $s(\lambda;l,a)$ on the basis of the data $\{\tilde{y}_n\}$, by means of the predetermined operator R and the parameters $p_R$;
    sub-procedure ISD_est The sub-procedure ISD_est comprises the following steps:

a) estimating positions l of peaks within a spectrum on the basis of the estimate $\hat{s}(\lambda)$ of $s(\lambda;l,a)$ by means of a maximum-detection algorithm;

b) estimating magnitudes a of the peaks, by means of a curve-fitting algorithm using one of the following methods:

the data $\{\tilde{y}_n\}$, $v_s(\lambda,l)$, the operator G with parameters $p_G$, and the estimate $\hat{l}$;

the estimate $\hat{s}(\lambda)$, $v_s(\lambda,l)$ and the estimate $\hat{l}$.

c) iteratively correcting the estimates of the parameters of peaks obtained in (a) and (b);

adapting the results of parameter estimation in accordance with user requirements, such as transformation of parameters into some pre-defined parameters of a telecommunication spectrum.

The idealized spectrum used for calibration $s(\lambda;l^{cal},a^{cal})$ is assumed to have the form:

$$s(\lambda; \mathbf{l}^{cal}, \mathbf{a}^{cal}) = \sum_{k=1}^{9} a_k^{cal} v_s(\lambda, l_k^{cal})$$

The chosen operator of projection, for mapping an idealized spectrum $s(\lambda;l,a)$ into the data space $$\{\tilde{y}_n\} = G[s(\lambda;l,a);p_G]$$

is defined by the following operations:

$$x(\lambda) = \exp\left[\int_{-\infty}^{+\infty} g_{sx}(\lambda - \lambda')\ln[s(\lambda'; \mathbf{l}, \mathbf{a})]d\lambda'\right]$$

$$y(\lambda) = \int_{-\infty}^{+\infty} g_{xy}(\lambda - \lambda')x(\lambda')d\lambda'$$

$$\hat{y}_n = y(\lambda_n) \quad \text{for } n = 1, \ldots, N$$

The function $g_{xy}(\lambda)$ is estimated to have the form of the Gauss function:

$$g_{xy}(\lambda) = \frac{1}{\sqrt{2\pi}\,\sigma_{xy}}\exp\left(-\frac{\lambda^2}{2\sigma_{xy}^2}\right)$$

Consequently, the vector of the parameters $p_G$ of the operator G contains discrete values of $g_{sx}(\lambda)$ and parameter $\sigma_{xy}$.

The chosen operator of reconstruction, for transforming the data $\{\tilde{y}_n\}$ into an estimate $\hat{s}(\lambda)$ of $s(\lambda;l,a)$, $$\hat{s}(\lambda) = R[\{\tilde{y}_n\};p_R],$$

is specified by the following steps:

a discrete estimate $\{\hat{x}_n\}$ $x(\lambda)$ is found by means of a rational filter applied to the data $\{\tilde{x}_n\}$; and, an estimate $\hat{s}(\lambda)$ of $s(\lambda;l,a)$ is computed using a spline-based Kalman filter applied to $\{\hat{x}_n\}$.

The vector $p_R = [p_{R,1}\ p_{R,2}\ \ldots]^T$ of parameters of the operator R contains coefficients of the rational filter as well as discrete values of the function $g_{sx}(\lambda)$ and regularization parameters for the spline-based Kalman filter.

The following operations are performed during calibration:

identification of a function $g_{sx}(\lambda)$, using an iterative algorithm such as the Jansson's algorithm described in P. A. Jansson, Ed., Deconvolution of spectra and images, Academic Press. Inc. (1997);

estimation of parameter $\sigma_{xy}$ of function $g_{xy}(\lambda)$ based on the ideal spectrum $x^{cal}(\lambda)$ using an optimization algorithm;

estimation of coefficients of the rational filter using an optimization algorithm; and, estimation of a regularization parameter of the spline-based Kalman filter, using an optimization algorithm.

As is evident to those of skill in the art, application of a method as herein described allows for capturing of spectral information with photodetectors that are other than aligned, generation of an approximately continuous spectrum from the captured data, and channelising the data in accordance with a design of the optical monitor device. Further, re-calibration will allow for a change in the number of channels supported by the device allowing for a single hardware device to be "configurable" as an optical monitor.

Advantageously, application of the above method provides for increased accuracy of spectrum monitoring accomplished by a given spectrometric system. The increased accuracy results from correction of instrumental errors and reduced uncertainty of estimation of parameters of monitored spectra. A reduced cost of monitoring with a given accuracy is achieved by replacing a higher-resolution spectrometric transducer with a functionally equivalent but low-resolution transducer, and by reducing manufacturing costs.

Many variations of operators and mathematical models or algorithms are useful in a method according to the invention. Though the above description is with respect to a single set of equations for augmenting resolution of a spectrum, other equations are also applicable. Some examples of other approaches for augmenting spectra according to the present invention are described below.

Optionally, the following mathematical models of the data is used for defining the operator G where the corresponding operators are set out below:

the stationary linear model:

$$y(\lambda) = \int_{-\infty}^{+\infty} g(\lambda - \lambda') s(\lambda'; 1, a) d\lambda';$$

the non-stationary linear model:

$$y(\lambda) = \int_{-\infty}^{+\infty} g(\lambda, \lambda') s(\lambda'; 1, a) d\lambda'; \quad \text{and,}$$

the non-linear model, e.g.:

$$y(\lambda) = \int_{-\infty}^{+\infty} g(\lambda, \lambda') F_s[s(\lambda'; 1, a)] d\lambda'$$

$$y(\lambda) = F_y \left[ \int_{-\infty}^{+\infty} g(\lambda, \lambda') F_s[s(\lambda'; 1, a)] d\lambda' \right]$$

where $g(\lambda)$ and $g(\lambda,\lambda')$ are the apparatus functions of the monitor; $F_s$ and $F_y$ are non-linear functions.

The corresponding operators G have the following forms:
the operator corresponding to the stationary linear model:

$$\hat{y}_n = \sum_v p_{G,n,v} \int_{\lambda_v}^{\lambda_{v+1}} s(\lambda'; 1, a) d\lambda'$$

where $p_{G,v} = g\left(\frac{\lambda_{v+1} + \lambda_v}{2}\right) \Delta\lambda;$ the operator corresponding to the non-stationary linear model:

$$\hat{y}_n = \sum_v p_{G,n,v} \int_{\lambda_v}^{\lambda_{v+1}} s(\lambda'; 1, a) d\lambda'$$

where $p_{G,n,v} = g\left(\lambda_n, \frac{\lambda_{v+1} + \lambda_v}{2}\right) \Delta\lambda;$ and, the operator corresponding to the exemplary non-linear models:

$$\hat{y}_n = \sum_v p_{G,n,v} \int_{\lambda_v}^{\lambda_{v+1}} F_s[s(\lambda'; 1, a)] d\lambda'$$

$$\hat{y}_n = F_y \left[ \sum_v p_{G,n,v} \int_{\lambda_v}^{\lambda_{v+1}} F_s[s(\lambda'; 1, a)] d\lambda' \right]$$

where $p_{G,n,v} = g\left(\lambda_n, \frac{\lambda_{v+1} + \lambda_v}{2}\right) \Delta\lambda.$ Optionally, the following methods of signal reconstruction in the form of deconvolution or generalized deconvolution are used for defining the operator R:

the original domain, numerical differentiation-based method as described, for example by Morawski & Sokolowski in 1995;

the iterative methods of Jansson and Gold;

the spectrum-domain, Tikhonov-regularization-based method;

the cepstrum-domain, Tikhonov-regularization-based method;

the original-domain, Tikhonov-regularization-based method with the positivity constraint imposed on the solution;

the Kalman-filter-based method with with the positivity constraint imposed on the solution;

the Kalman-filter-based method with spline-approximation of the solution;

the adjoint-operator method as described by Morawski & Pawinski in 1995;

the entropy-based variational method;

the Volterra-series-based methods;

the rational-filter-based method as described by Szczecinski et al. in 1997.

Moreover, many other methods developed in the domains of telecommunications, seismology and image processing are applicable with the method according to the invention for spectral resolution augmentation. Selection of mathematical algorithms for use in the present invention is straightforward for one of skill in the art without undue experimentation.

The following methods are applicable for determining the regularization parameters of the operator R:

the disrepancy principle with a pre-estimate of the variance of measurement errors in the data as described by Tikhonov et al. in 1995;

the method of the L-curve as described by Hansen & O'Leary in 1991;

the method of additional set of calibration data as described by Szczecinski et al. in 1995.

Calibration is also described above with relation to an exemplary embodiment thereof. Optionally, the isolated peak $v_s(\lambda,l)$ is assumed to have the following forms:

the Dirac distribution $\delta(\lambda)$ for all values of l;

a triangle whose width is constant or varying versus l;
a rectangle whose width is constant or varying versus l;
a Gauss function whose width is constant or varying versus l; and,
a Lorenz function whose width is constant or varying versus l.

Optionally, at least one of the following methods is used for estimation of the apparatus function $g(\lambda)$:

smoothing approximation applied directly to the data $\{\tilde{y}_n^{cal}\}$ if the isolated peak $v_s(\lambda,l)$ is assumed to have the form of the Dirac distribution $\delta(\lambda)$;

deconvolution of the data $\{\tilde{y}_n^{cal}\}$ with respect to $s(\lambda;l^{cal}, a^{cal})$; and subsequent use of deconvolution and smoothing approximation.

Optionally, at least one of the following methods is used for determining other parameters of the operator R:

a direct transformation of the parameters of the operator G;

the minimization of any norm of the solution $\|p_R\|$ under constraints imposed on another norm of the disrepancy $\|s(\lambda,l^{cal},a^{cal})-R[\{\tilde{y}_n^{cal}\};p_R]\|$ the minimization of any norm of the disrepancy $\|s(\lambda;l^{cal}, a^{cal})-R[\{\tilde{y}_n^{cal}\};p_R]\|$ under constraints imposed on another norm of the solution $\|p_R\|$.

Optionally, at least one of the following methods is used for estimation of magnitudes a of peaks, given the estimates $\hat{l}$ of their positions l:

$$\hat{a}=arg_a inf\{\|\{\tilde{y}_n\}-G[s(\lambda;\hat{l},a);p_G]\|_q | a \in A\};$$

and $$\hat{a}=arg_a inf\{\|\hat{s}(\lambda)-s(\lambda;\hat{l},a)\|_q | a \in A\}$$

with A—being a set of feasible solutions; options: q=2 and $A \subset R^k$; q=∞ and $A \subset R^k$; q=2 and $A \subset R_+^k$; q=∞ and $A \subset R_+^k$. Some examples of algorithmic solutions are given in Deming S. N., Morgan S. L.: *Experimental Design: A Chemometric Approach*, Elsevier 1987; Fraser R. D. B., Suzuki E.: "Biological Applications". In: *Spectral Analysis—Methods and Techniques* (ed by J. A. Balckburn), M. Dekker, 1970, pp. 171–211; Fister III J. C., Harris J. M.: "Multidimensional Least Squares Resolution of Excited State Raman Spectra", *Anal. Chem.*, Vol. 67, No. 4, 1995b, pp.701–709 ; Fister III J. C., Harris J. M.: "Multidimensional Least Squares Resolution of Raman Spectra from Intermediates in Photochemical Reactions", *Anal. Chem.*, Vol. 67, No. 8, 1995a, pp.1361–1370; Goodman K. J., Brenna T.: "Curve Fitting for Restoration of Accuracy of Overlapping Peaks in Gas Chromatography/Combustion Ratio Mass Spectrometry", *Anal. Chem.*, Vol.66, No. 8, 1994, pp. 1294–1301; Miekina et al. "Incorporation of the Positivity Constraint into a Tikhonov-method-based Algorithm of Measurand Reconstruction". *Proc. IMEKO-TC1&TC7 Colloquium* (London, UK, Sep. 8–10, 1993), pp. 299–304 and so forth. A particularly effective solution of the above optimization problem is based on a non-stationary Kalman filter or an adaptive LMS algorithm as described in Ben Slima M., Szczecinski L., Massicotte D., Morawski R. Z., Barwicz A.: "Algorithmic Specification of a Specialized Processor for Spectrometric Applictions", *Proc. IEEE Instrum. & Meas. Technology Conf.* (Ottawa, Canada, May 19–21, 1997), pp. 90–95 and in Ben Slima M., Morawski R. Z., Barwicz A.: "Kalman-filter-based Algorithms of Spectrophotometric Data Correction—Part II: Use of Splines for Approximation of Spectra", *IEEE Trans. Instrum. & Meas.*, Vol. 46, No. 3, June 1997, pp. 685–689.

Optionally, methods for estimation of the magnitudes a are used for iterative correction of estimates of magnitudes a and positions l of the peaks. Known methods include the following:

$$\hat{l}=arg_l inf\{\|\{\tilde{y}_n\}-G[s(\lambda;l,\hat{a});p_G]\|_q | l \in L\}$$

and $$\hat{l}=arg_l inf\{\|\hat{s}(\lambda)-s(\lambda;l,\hat{a})\|_q | l \in L\}$$

with L being a set of feasible solutions; options: q=2 and $L \subset R^k$; q=∞ and $L \subset R^k$; q=2 and $L \subset R_+^k$; q=∞ and $L \subset R_+^k$.

According to the method set out above, the data are pre-processed. The pre-processing is performed according to known techniques and for known purposes with relation to the methods selected for augmenting resolution of the spectral data and the sensor with which the pre-processing is used. Optionally, one of the following methods is used for normalization of the data:

the linear or nonlinear transformation of the $\lambda$-axis, aimed at diminishing the non-stationarity effects in the data;

the linear or nonlinear transformation of the y-axis, aimed at diminishing the non-linearity effects in the data;

the linear or nonlinear transformation of the $\lambda$-axis and y-axis, aimed at diminishing the non-stationarity and non-linearity effects in the data.

Optionally, one of the following methods is used for smoothing the data:

the linear, FIR-type or IIR-type, filtering;

the median filtering;

the smoothing approximation by cubic splines;

the deconvolution with respect to an identity operator.

Baseline correction is performed according to standard known techniques such as those described in Brame E. G., Grasselli J., *Infrared and Raman Spectroscopy*, Marcel Dekker 1976.

Figure 6:
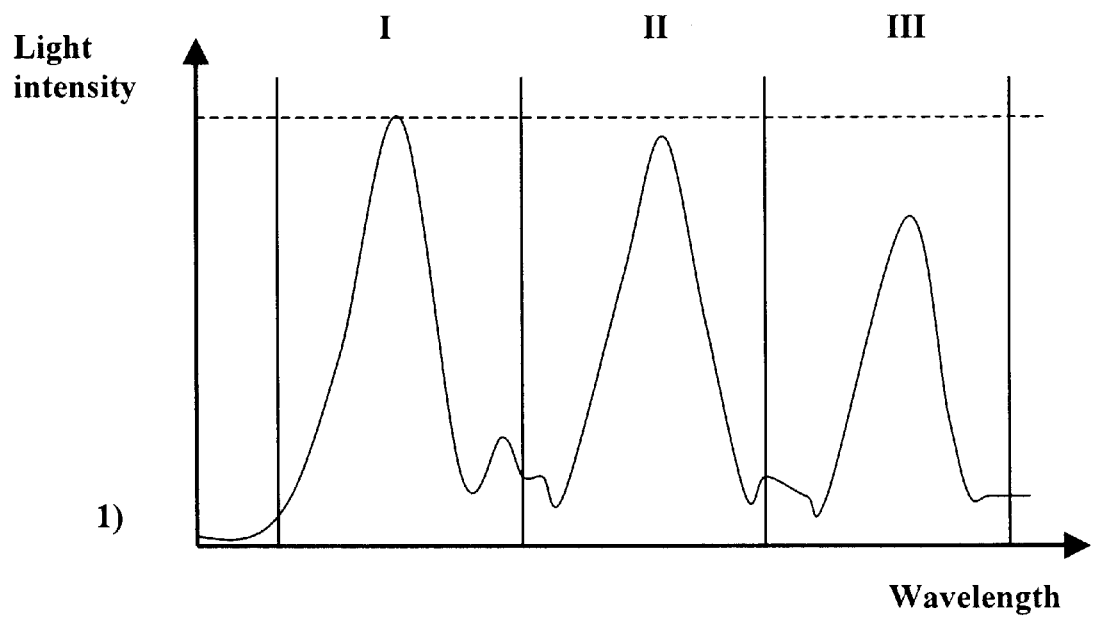
FIG. 6 is a simplified diagram illustrating schematically two augmented spectra for determining the polarisation of a light signal.
Figure 6:
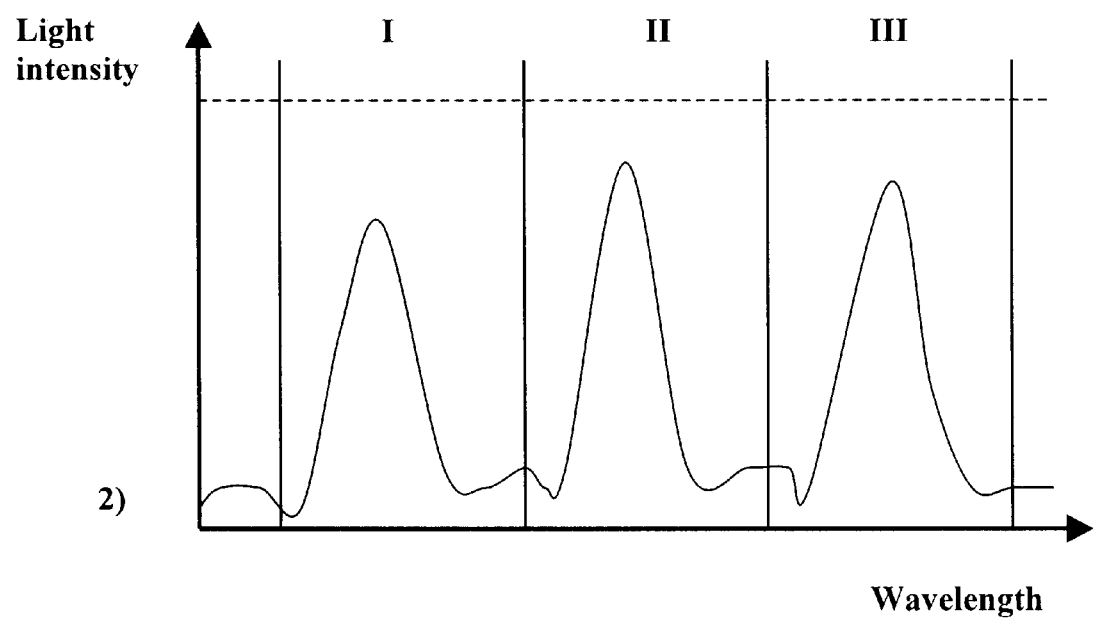

FIG. 6 illustrates schematically two augmented spectra, light intensity versus wavelength after processing of the two unchannelized spectra detected by the detector arrays 223 and 227—limited to three wavelength channels for simplification. Comparing the peaks of each of the wavelength channels I, II, and III and knowing the optical characteristics of the beam splitter 203 and those of the dispersive elements 220 and 226 allows the determination of the ratio of the principal states of polarisation $T_E$ and $T_M$. Numerous methods for comparing the peaks are applicable using the augmented spectrum. For example, the maximum of each of the peak is determined and then compared for each wavelength channel one against the peak within a corresponding wavelength channel detected by the other detector. Another method is the comparison of an average value of a predetermined section of each peak including the maximum of the peak. Yet another method is the comparison of a plurality of magnitudes of each peak at predetermined wavelengths, determining the polarisation ratio for each predetermined wavelength and averaging the polarisation ratios of the plurality of predetermined wavelengths within each wavelength channel. Optionally, additional information obtained through a calibration process such as data indicating the relation between the sensed light intensity and the ratio of the principal states of polarisation for different wavelengths is used, further enhancing accuracy.

As is evident, use of the augmented spectra for determining the polarisation substantially increases accuracy compared to processing of the channelized signals illustrated above with reference to FIG. 1. Furthermore, the multi-wavelength polarisation monitor 200 is an accurate monitoring device absent extremely fine manufacturing tolerances.

Figure 7A:
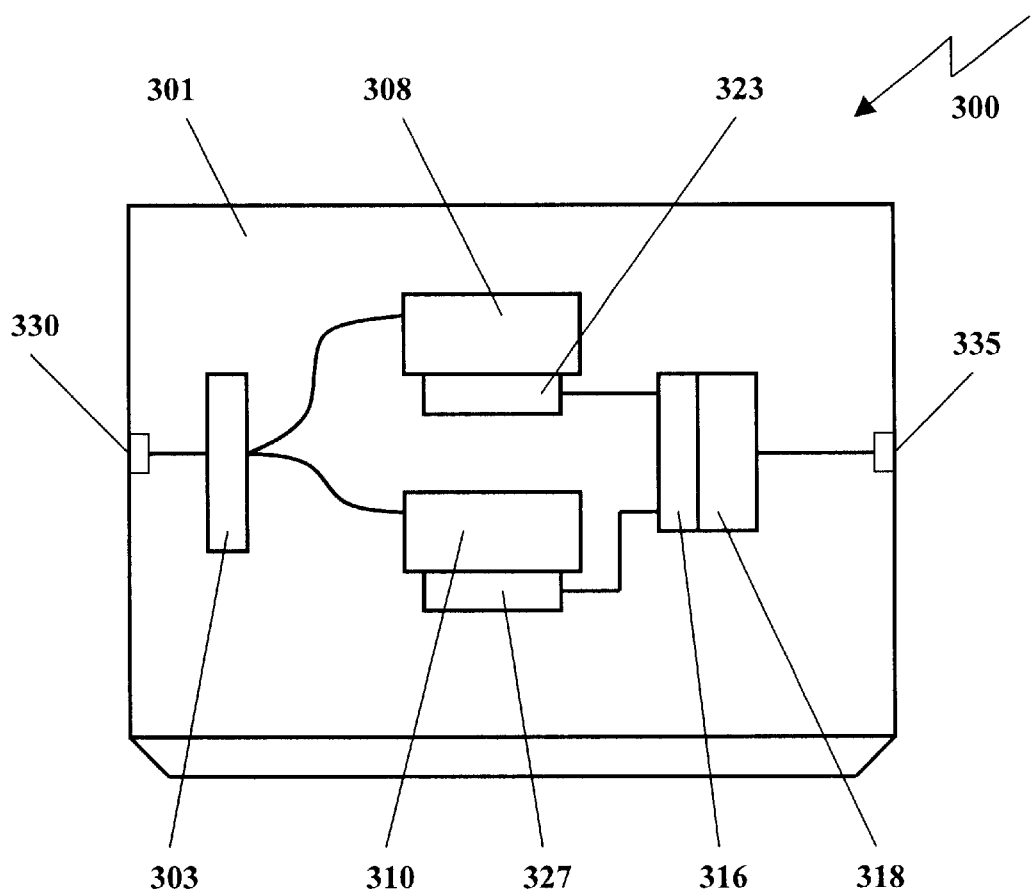
FIG. 7a is a simplified block diagram of an embodiment of a multi-wavelength polarisation monitor according to the invention.
Figure 7B:
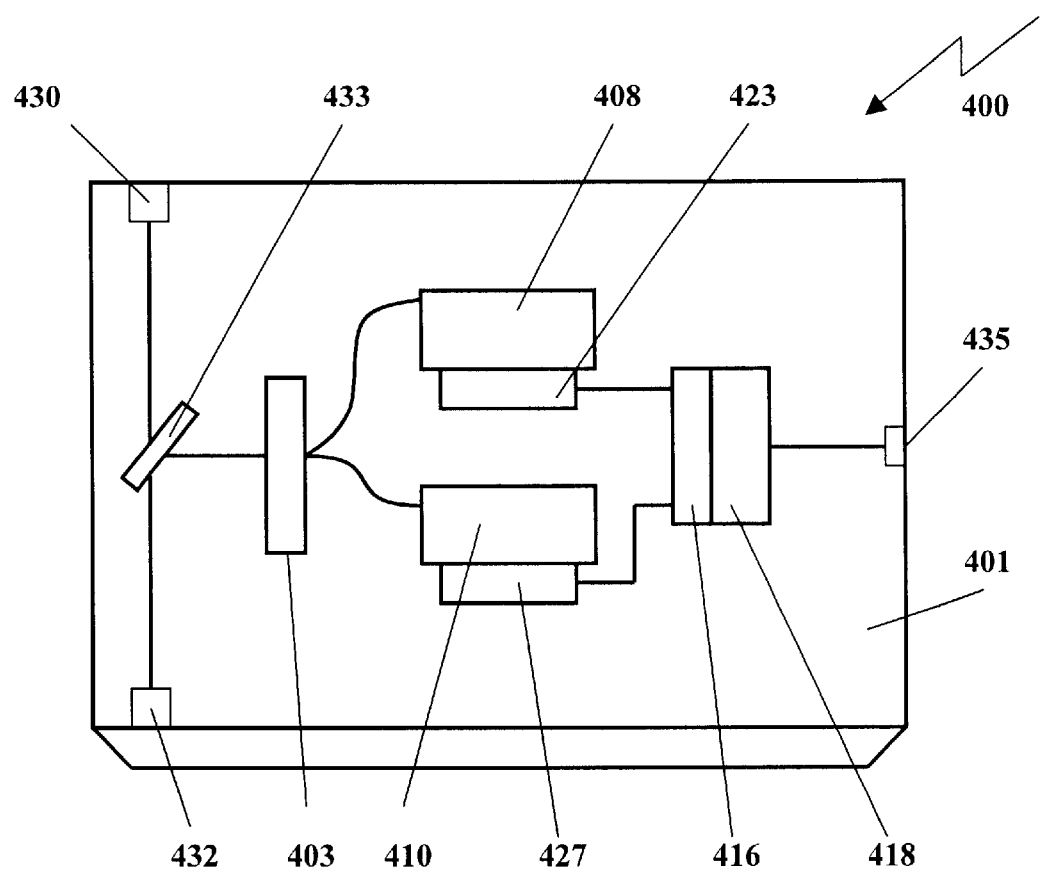
FIG. 7b is a simplified block diagram of an embodiment of a multi-wavelength polarisation monitor according to the invention.

Referring to FIGS. 7a and 7b, alternative embodiments of a multi-wavelength polarisation monitor according to the invention are shown. Using semiconductor integration technologies such as CMOS technology, the multi-wavelength polarisation monitors are manufactured as integrated devices. Here, the optical components as well as the signal processing components are integrated together on a substrate. Referring to FIG. 7a, a multi-wavelength polarisation monitor 300 according to the invention is shown. The monitor 300 is connected to a fibre optical network via port 330. A received light signal is beam split in beam splitter 303 and provided to dispersive elements 308 and 310 having different PDL. The signal spectra are detected using detector arrays 323 and 327. The detected signal spectra are digitised using A/D converter 316 and are digitally processed in processor 318 as outlined above. A digital output signal is provided via port 335. All components are integrated on substrate 301. The multi-wavelength monitor 300 is highly advantageous for optical network applications. Its integrated design provides means for manufacturing a very compact device at relatively low cost.

Referring to FIG. 7b yet another embodiment of an integrated multi-wavelength polarisation monitor 400 according to the invention is shown. Here, the monitor 400 comprises two optical ports 430 and 432 for interposing the monitor into a fibre optical network and a signal tapping element 433 having known optical characteristics for tapping a small signal portion and providing it to beamsplitter 403. This embodiment facilitates installation into a fibre optical network and allows monitoring during operation of the network.

Figure 8A:
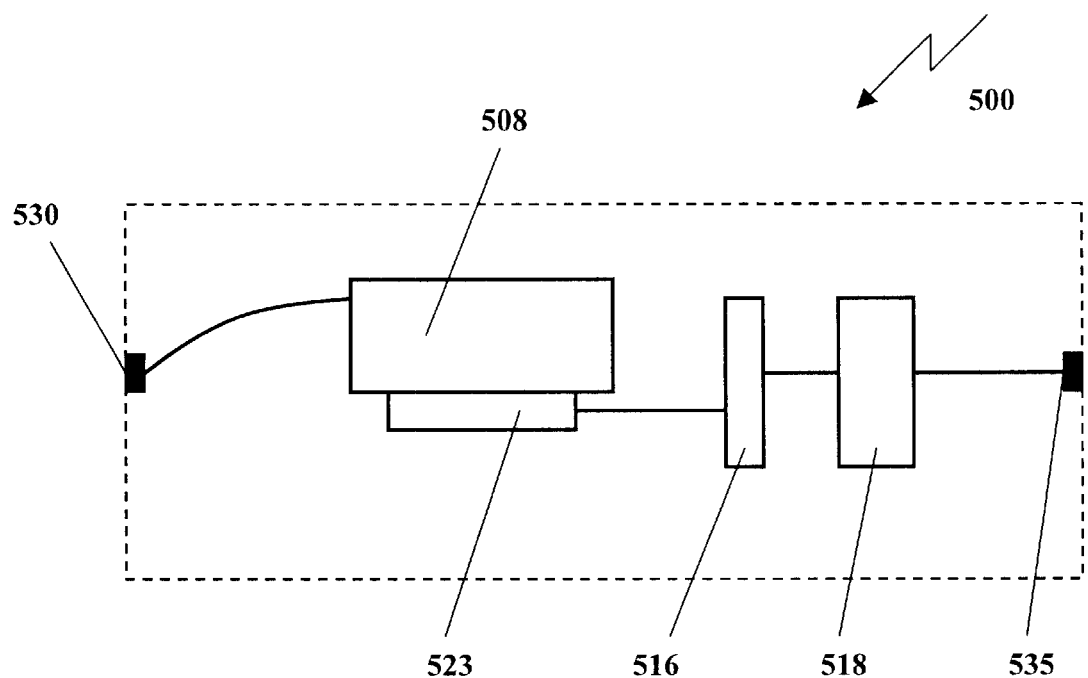
FIG. 8a simplified block diagram of another embodiment of a multi-wavelength polarisation monitor according to the invention; and, FIG. 8b is a simplified flow diagram of another method for monitoring the polarisation of a multi-wavelength light signal according to the invention.
Figure 8B:
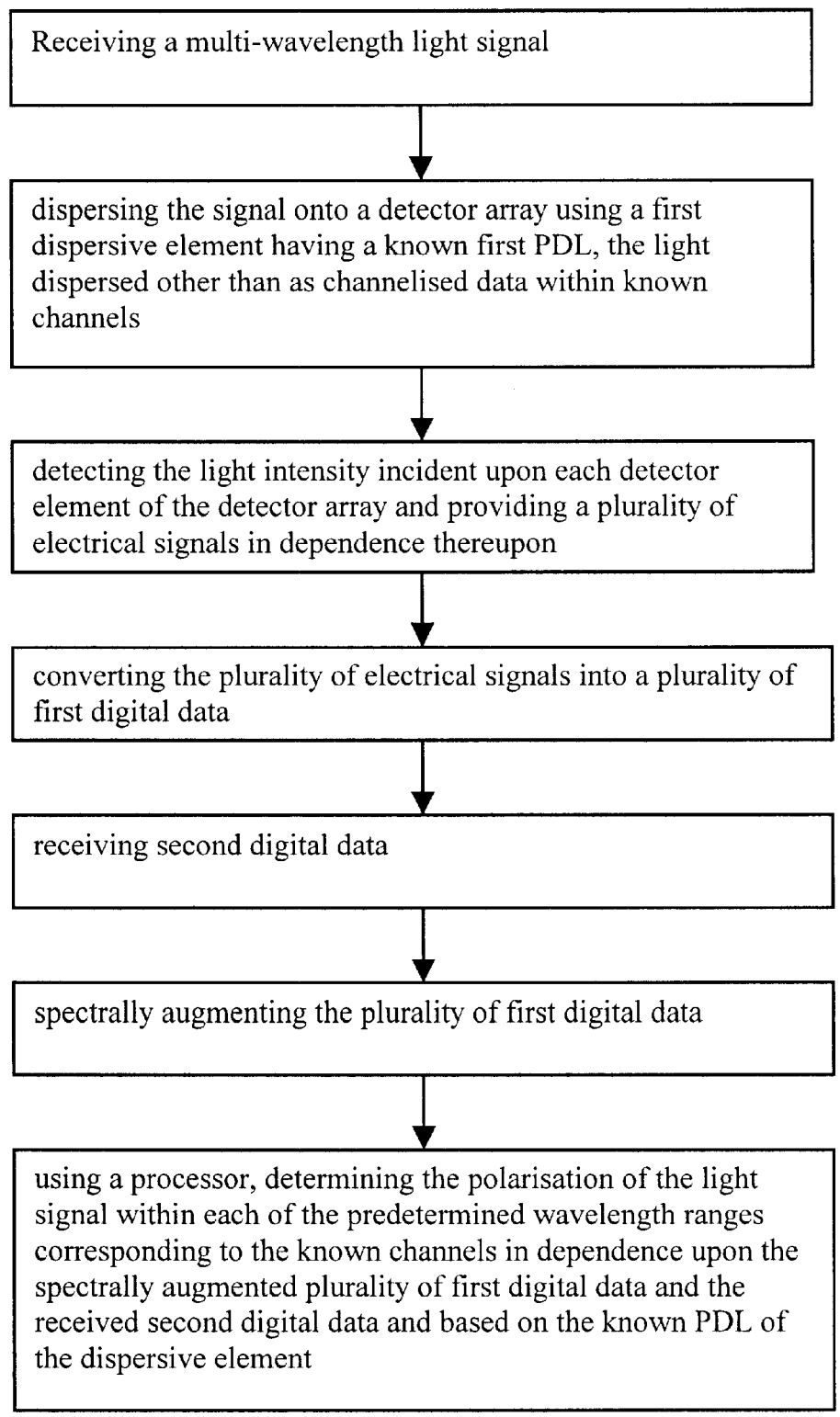

FIGS. 8a and 8b illustrate a further embodiment of a multi-wavelength polarisation monitor 500 according to the invention. The monitor 500 comprises an optical port 530 for connecting to a fibre optical network, a dispersive element 508 having known polarisation-dependent characteristics, a detector array 523, an A/D converter 516, a processor 518 and a digital port 535. For determining the polarisation of a light signal provided to port 530 this monitor needs to be provided with further data. For example, the monitor 500 is provided with data indicative of a spectrum of a substantially same light signal with known polarisation. Alternatively, the monitor 500 is provided with data indicative of a spectrum of a substantially same light signal obtained using an optical path having a different polarisation-dependent characteristics. Further alternatively, the monitor 500 is provided with data indicative of a dependence of the spectrum upon polarisation. Such data are, for example, obtained through a calibration process. Comparison of the provided spectrum with the detected spectrum then allows determination of the polarisation of the detected signal. The methods for augmenting the signal spectrum and comparing spectra outlined above also apply here.

For example, a light signal is detected during installation or test of a fibre optical network at predetermined nodes and its spectrum and polarisation is determined thereof using a monitor illustrated above. For monitoring deviations of the polarisation from the test data during operation of the network the simpler monitors 500 are installed at the predetermined nodes. This allows use of even simpler and cheaper devices for fixed installation in a network. Monitoring the deviations of the polarisation provides information of the performance of the various components of the network and allows, for example, detection of the degradation of a component or connection. This is highly advantageous, because the degradation is detected while the component is still operating and, therefore, the component is then replaced during routine maintenance without causing an interruption due to failure.

Accordingly, so long as the ratio of polarisation components within each of the split signals detected at the detectors allows for accurate mathematical determination of polarisation components of the received signal, the method is applicable. For example, if a first 40 channel demultiplexer affects channels 0–19 by reducing their $T_M$ component by 20% and the second 40 channel demultiplexer affects channels 20–39 by reducing their $T_E$ component by 20%. The resulting steps are as follows:

Calculate the mean intensity within each of the first 20 channels as detected by the first detector and the second detector. This mean is indicative of a general signal level and will be affected by losses induced within the splitter, guiding of light, demultiplexers, coupling losses, and any other losses. Thus, the mean of the signals detected by a first detector coupled to the first demultiplexer need not be lower than the mean of the signals detected by a second detector coupled to the second demultiplexer. That said, it is known what the optical characteristics of each optical path is. Therefore, a comparison of the mean value is indicative of the general proportion of channels 0–19 that are attributable to each polarisation state.

Of course, channel by channel comparisons are then performed to determine polarisation components within each channel.

A similar set of steps is performed for channels 20–39.

The above example is very simplistic and this need not be the case. For example, when light within channel 1 and received by the first detectors is attenuated 50% for $T_M$ radiation, light within channel 1 and received by the second detectors is attenuated 25% for $T_M$ radiation and the remainder of the light is affected by other non-identical PDL, data for the single channel is usable to measure polarisation within the received signal for each channel. From data relating to channel 1 it is simple to extract an intensity of the signal within said channel. The intensity is related to the $T_E$ and $T_M$ components and some calibration formula or constants. Here, the intensity measured by the first detector excludes 50% of the $T_M$ radiation and as such relates heavily to $T_E$. The intensity measured at the second detector excludes 50% of the $T_M$ radiation. So the intensities are adjusted to reflect losses within the optical path and then, the amount of $T_E$ and $T_M$ radiation are interdependently determinable. Of course, once determined, the adjustment to the intensities is verifiable as correct. An iterative approach to adjusting the intensities and determining polarisation components is implemented.

Once this approach is completed, it is repeatable for each further channel for which polarisation monitoring is desired.

Numerous other embodiments of the invention will be apparent to persons skilled in the art without departing from the spirit and scope of the invention as defined in the appended claims.

What is claimed is:

1. A method for monitoring the polarisation of a multi-wavelength light signal in an optical network comprising the steps of:

beam splitting the light signal into two portions using a beam splitter having known optical characteristics, wherein the polarization of at least one of the two portions comprises both a $T_E$ and a $T_M$ component;

demultiplexing a first signal portion of the two separated signal portions into a first plurality of signals within each of predetermined wavelength ranges corresponding to known channels using a first demultiplexer having known first polarisation-dependent characteristics;

detecting a light intensity of each of the first plurality of signals and providing a first plurality of electrical signals in dependence thereupon;

demultiplexing a second signal portion of the two separated signal portions into a second plurality of signals within each of the predetermined wavelength ranges corresponding to the known channels using a second demultiplexer having known second polarisation-dependent characteristics;

detecting a light intensity of each of the second plurality of signals and providing a second plurality of electrical signals in dependence thereupon;

converting the first and second plurality of electrical signals into a first and second plurality of digital data; and, using a processor, determining the polarisation of the light signal of each wavelength channel in dependence upon the first and second plurality of digital data and based on the known optical characteristics and first and second polarisation-dependent characteristics.

2. A method for monitoring the polarisation of a light signal as defined in claim 1, wherein the polarization of both of the two portions comprises both a $T_E$ and a $T_M$ component.

3. A method for monitoring the polarisation of a light signal as defined in claim 2, wherein the optical characteristics, the polarisation-dependent characteristics of the first and second demultiplexers are determined through a calibration process.

4. A method for monitoring the polarisation of a light signal as defined in claim 3, wherein the second demultiplexer has second polarisation-dependent characteristics different from the first polarisation-dependent characteristics.

5. A method for monitoring the polarisation of a light signal as defined in claim 3, wherein the first and second polarisation-dependent characteristics are same polarisation-dependent characteristics, and wherein a polarisation affecting device is interposed in the optical path of one of the first and second signal portion.

6. A method for monitoring the polarisation of a light signal as defined in claim 4, wherein the first demultiplexer comprises an array waveguide grating.

7. A method for monitoring the polarisation of a multi-wavelength light signal in an optical network comprising the steps of:

beam splitting the light signal into two portions using a beam splitter having known optical characteristics, wherein the polarization of at least one of the two portions comprises both a $T_E$ and a $T_M$ component;

dispersing the first signal portion of the two separated signal portions onto a first detector array using a first dispersive element having known first polarisation-dependent characteristics;

detecting the light intensity incident upon each detector element of the first detector array and providing a first plurality of electrical signals in dependence thereupon;

dispersing the second signal portion of the two separated signal portions onto a second detector array using a second dispersive element having known second polarisation-dependent characteristics;

detecting the light intensity incident upon each detector element of the second detector array and providing a second plurality of electrical signals in dependence thereupon;

converting the first and second plurality of electrical signals into a first and second plurality of digital data; and, using a processor, determining the polarisation of the light signal of each wavelength channel in dependence upon the first and second plurality of digital data and based on the known optical characteristics and the first and second polarisation-dependent characteristics.

8. A method for monitoring the polarisation of a multi-wavelength light signal in an optical network as defined in claim 7, wherein the polarization of both of the two portions comprises both a $T_E$ and a $T_M$ component.

9. A method for monitoring the polarisation of a multi-wavelength light signal in an optical network as defined in claim 8, wherein the first and second signal portions are dispersed other than as channelised data within known channels.

10. A method for monitoring the polarisation of a multi-wavelength light signal in an optical network as defined in claim 9, wherein the dispersed first and second signal portions each are indicative of a spectrum in dependence upon the light signal.

11. A method for monitoring the polarisation of a multi-wavelength light signal in an optical network as defined in claim 10, comprising the step of augmenting the spectral data.

12. A method for monitoring the polarisation of a multi-wavelength light signal in an optical network as defined in claim 11, wherein the step of augmenting the spectral data comprises spectral enhancement of the spectral data.

13. A method for monitoring the polarisation of a multi-wavelength light signal in an optical network as defined in claim 12, comprising the step of estimating spectral values based on calibration data.

14. A method for monitoring the polarisation of a multi-wavelength light signal in an optical network as defined in claim 13, wherein the step of determining the polarisation of the light signal comprises the step of comparing predetermined characteristics of the spectrum of the first signal with predetermined characteristics of the spectrum of the second signal for each wavelength channel.

15. A method for monitoring the polarisation of a multi-wavelength light signal in an optical network as defined in claim 14, wherein the predetermined characteristics comprise a peak.

16. A method for monitoring the polarisation of a multi-wavelength light signal in an optical network as defined in claim 15, wherein the predetermined characteristics comprise the maximum of peak.

17. A method for monitoring the polarisation of a multi-wavelength light signal in an optical network as defined in claim 15, wherein the predetermined characteristics comprise a predetermined section of the peak including the maximum of the peak.

18. A method for monitoring the polarisation of a multi-wavelength light signal in an optical network as defined in claim 17, comprising the step of averaging the values of the predetermined section.

19. A method for monitoring the polarisation of a multi-wavelength light signal in an optical network as defined in claim 14, comprising the steps of:

determining a polarisation ratio of the principal states of polarisation for a plurality of predetermined wavelengths within the range of each wavelength channel; and, averaging the polarisation ratios of the plurality of predetermined wavelengths within the range of each wavelength channel.

20. A method for monitoring the polarisation of a multi-wavelength light signal in an optical network as defined in claim 13, wherein the polarisation of the light signal of each wavelength channel is determined based on additional information.

21. A method for monitoring the polarisation of a multi-wavelength light signal in an optical network as defined in claim 20, wherein the additional information is obtained through a calibration process.

22. A method for monitoring the polarisation of a multi-wavelength light signal in an optical network as defined in claim 21, wherein the additional information comprises data indicating the relation between the sensed light intensity and the ratio of the principal states of polarisation for different wavelengths.

23. A multi-wavelength polarisation monitor comprising:
an input port for receiving a light signal;
a beam splitter having known optical characteristics for beam splitting the light signal into two portions, wherein the polarization of at least one of the two portions comprises both a $T_E$ and a $T_M$ component;
a first demultiplexer having known first polarisation-dependent characteristics for demultiplexing the first signal portion of the two separated signal portions into a first plurality of signals corresponding to wavelength channels;
a first plurality of detectors for detecting the light intensity of each of the first plurality of signals and providing a first plurality of electrical signals in dependence thereupon;
a second demultiplexer having known second polarisation-dependent characteristics for demultiplexing the second signal portion of the two separated signal portions into a second plurality of signals corresponding to wavelength channels;
a second plurality of detectors for detecting the light intensity of each of the second plurality of signals and providing a second plurality of electrical signals in dependence thereupon;
an A/D converter for converting the first and second plurality of electrical signals into a first and second plurality of digital data; and,
a processor for determining the polarisation of the light signal of each wavelength channel in dependence upon the first and second plurality of digital data and based on the known optical characteristics and the polarisation-dependent characteristics of the first and second demultiplexers.

24. A multi-wavelength polarisation monitor as defined in claim 23, comprising at least a waveguide for guiding the light signal within the monitor.

25. A multi-wavelength polarisation monitor as defined in claim 24, wherein the first and second demultiplexers comprise array waveguide gratings.

26. A multi-wavelength polarisation monitor comprising:
an input port for receiving a light signal;
a beam splitter having known optical characteristics for beam splitting the light signal into a first and a second signal portion, wherein the polarization of at least one of the first and the second signal portion comprises both a $T_E$ and a $T_M$ component;
a first dispersive element having known first polarisation-dependent characteristics for dispersing the first signal portion onto a first detector array, the light dispersed other than as channelised data within known channels;
a first detector array having more detector elements than a number of known channels for detecting the light intensity incident upon each detector element of the first detector array and providing a first plurality of electrical signals in dependence thereupon;
a second dispersive element having known second polarisation-dependent characteristics for dispersing the second signal portion onto a second detector array, the light dispersed other than as channelised data within the known channels;
a second detector array having more detector elements than a number of known channels for detecting the light intensity incident upon each detector element of the second detector array and providing a second plurality of electrical signals in dependence thereupon;
an A/D converter for converting the first and second plurality of electrical signals into a first and second plurality of digital data; and,
a processor for performing spectral augmentation on the first and second plurality of digital data and for determining the polarisation of the light signal within each of the predetermined wavelength ranges corresponding to the known channels in dependence upon the spectrally augmented first and second plurality of digital data and based on the known optical characteristics and polarisation-dependent characteristics of the first and second dispersive elements.

27. A multi-wavelength polarisation monitor as defined in claim 26, wherein the dispersive element is an array waveguide grating.

28. A multi-wavelength polarisation monitor as defined in claim 26, wherein the detector array comprises at least a number of detectors equal to three times the number of known channels.

29. A multi-wavelength polarisation monitor as defined in claim 28, wherein the detector array comprises at least a number of detectors equal to three times the number of known channels plus at least two further detectors.

30. A multi-wavelength polarisation monitor as defined in claim 29, wherein the detector array comprises a photodetector array.

31. A multi-wavelength polarisation monitor as defined in claim 26, comprising a signal tapping element for separating a small portion of the light signal as a tapped portion from the remaining untapped portion of he light signal; and, a second port for providing the untapped portion of the light signal.

32. A multi-wavelength polarisation monitor as defined in claim 27, wherein the components of the monitor are integrated on a same substrate.

* * * * *